(12) United States Patent
Shepherd

(10) Patent No.: US 11,661,291 B2
(45) Date of Patent: May 30, 2023

(54) SUPPORT APPARATUS FOR PROPPANT STORAGE CONTAINERS

(71) Applicant: SANDBOX ENTERPRISES, LLC, Katy, TX (US)

(72) Inventor: Justin Shepherd, Houston, TX (US)

(73) Assignee: SANDBOX ENTERPRISES, LLC, Katy, TX (US)

( * ) Notice: Subject to any disclaimer, the term of this patent is extended or adjusted under 35 U.S.C. 154(b) by 63 days.

(21) Appl. No.: 17/086,050

(22) Filed: Oct. 30, 2020

(65) Prior Publication Data

US 2021/0130113 A1     May 6, 2021

Related U.S. Application Data

(60) Provisional application No. 62/928,784, filed on Oct. 31, 2019.

(51) Int. Cl.
| | |
|---|---|
| *B65G 65/00* | (2006.01) |
| *B65G 11/02* | (2006.01) |
| *B65D 88/54* | (2006.01) |
| *B65G 65/40* | (2006.01) |

(52) U.S. Cl.
CPC .......... *B65G 65/005* (2013.01); *B65D 88/54* (2013.01); *B65G 11/026* (2013.01); *B65G 65/40* (2013.01); *B65G 2203/0258* (2013.01); *B65G 2203/042* (2013.01)

(58) Field of Classification Search
CPC ...... B65G 65/34; B65G 69/183; B65G 65/40; B65G 2203/0258; B65G 2203/042; B65D 88/121; B65D 88/30
See application file for complete search history.

(56) References Cited

U.S. PATENT DOCUMENTS

| | | |
|---|---|---|
| 2,652,174 A | 9/1953 | West et al. |
| 2,802,603 A | 8/1957 | Cecil |
| 2,867,336 A | 1/1959 | Soldini et al. |
| 3,602,400 A | 8/1971 | Cooke |
| 3,651,910 A * | 3/1972 | Buschbom .......... A01F 25/2009 193/17 |

(Continued)

FOREIGN PATENT DOCUMENTS

WO     2014028316 A1     2/2014

*Primary Examiner* — Kaitlin S Joerger
(74) *Attorney, Agent, or Firm* — Osha Bergman Watanabe & Burton LLP

(57) ABSTRACT

A support apparatus includes a frame assembly with an elevated load surface for supporting a modular proppant container in a position above a ground level. A chute assembly is supported by the frame assembly beneath the elevated load surface. A gate actuator has a coupling configured to engage with a gate assembly of the modular proppant container supported on the elevated load surface and a drive mechanism extending between the frame assembly and the coupling to selectively position the coupling for adjusting the gate assembly. The support apparatus may include a base frame section having a recessed region beneath the elevated load surface providing a feed station, an on-board subsystem attached to the frame assembly for operating the support apparatus in a stand-alone mode or an in-situ weigh station configured to measure the weight of the modular proppant container supported on an elevated surface in the rectangular container bay.

20 Claims, 21 Drawing Sheets

(56) References Cited

U.S. PATENT DOCUMENTS

| | | | |
|---|---|---|---|
| 3,986,708 A | 10/1976 | Heltzel et al. | |
| 4,441,821 A * | 4/1984 | Burkhart | B28C 9/0463 193/15 |
| 4,754,869 A * | 7/1988 | Hutchison | B65G 47/20 239/666 |
| 4,953,752 A | 9/1990 | Tousignant et al. | |
| 5,096,096 A | 3/1992 | Calaunan | |
| 5,339,996 A | 8/1994 | Dubbert et al. | |
| 5,415,323 A | 5/1995 | Fenelon | |
| 5,445,289 A | 8/1995 | Owen | |
| 5,551,776 A * | 9/1996 | Zimmerman | B28C 5/4251 193/6 |
| 8,585,341 B1 | 11/2013 | Oren et al. | |
| 9,809,381 B2 | 11/2017 | Oren et al. | |
| 10,287,091 B2 | 5/2019 | Allegretti | |
| 10,526,136 B2 * | 1/2020 | Hawkins | B65D 88/26 |
| 10,994,954 B2 * | 5/2021 | Allegretti | B65G 67/06 |
| 2003/0121760 A1 * | 7/2003 | Forrest | B65G 69/0441 198/523 |
| 2007/0014185 A1 | 1/2007 | Diosse et al. | |
| 2008/0226434 A1 | 9/2008 | Smith et al. | |
| 2009/0129903 A1 | 5/2009 | Lyons, III | |
| 2012/0099954 A1 | 4/2012 | Teichrob et al. | |
| 2013/0142601 A1 | 6/2013 | Mciver et al. | |
| 2013/0223960 A1 | 8/2013 | Schoenfeld et al. | |
| 2014/0023463 A1 | 1/2014 | Oren | |
| 2014/0023464 A1 | 1/2014 | Oren et al. | |
| 2014/0023465 A1 | 1/2014 | Oren et al. | |
| 2014/0044508 A1 | 2/2014 | Luharuka et al. | |
| 2014/0203046 A1 | 7/2014 | Allegretti | |
| 2015/0003943 A1 | 1/2015 | Oren et al. | |
| 2015/0360856 A1 | 12/2015 | Oren et al. | |
| 2016/0046454 A1 | 2/2016 | Oren et al. | |
| 2016/0122125 A1 | 5/2016 | Friesen et al. | |
| 2016/0280476 A1 * | 9/2016 | Stegemoeller | E21B 43/267 |
| 2017/0217671 A1 | 8/2017 | Allegretti | |
| 2017/0334639 A1 | 11/2017 | Hawkins et al. | |
| 2018/0065814 A1 | 3/2018 | Eiden, III et al. | |
| 2018/0072515 A1 | 3/2018 | D'Agostino et al. | |
| 2018/0229925 A1 | 8/2018 | Allegretti | |
| 2018/0229926 A1 | 8/2018 | Allegretti | |
| 2018/0305142 A1 | 10/2018 | Belcher et al. | |
| 2019/0009231 A1 | 1/2019 | Warren | |
| 2019/0106273 A1 * | 4/2019 | Hess | B65G 11/186 |
| 2019/0222054 A1 * | 7/2019 | Zettel | H01M 50/204 |
| 2019/0326846 A1 * | 10/2019 | Ansari | C02F 1/006 |
| 2020/0048985 A1 | 2/2020 | Oehler et al. | |
| 2020/0240239 A1 | 7/2020 | Oehler et al. | |
| 2020/0240240 A1 | 7/2020 | Oehler et al. | |

* cited by examiner

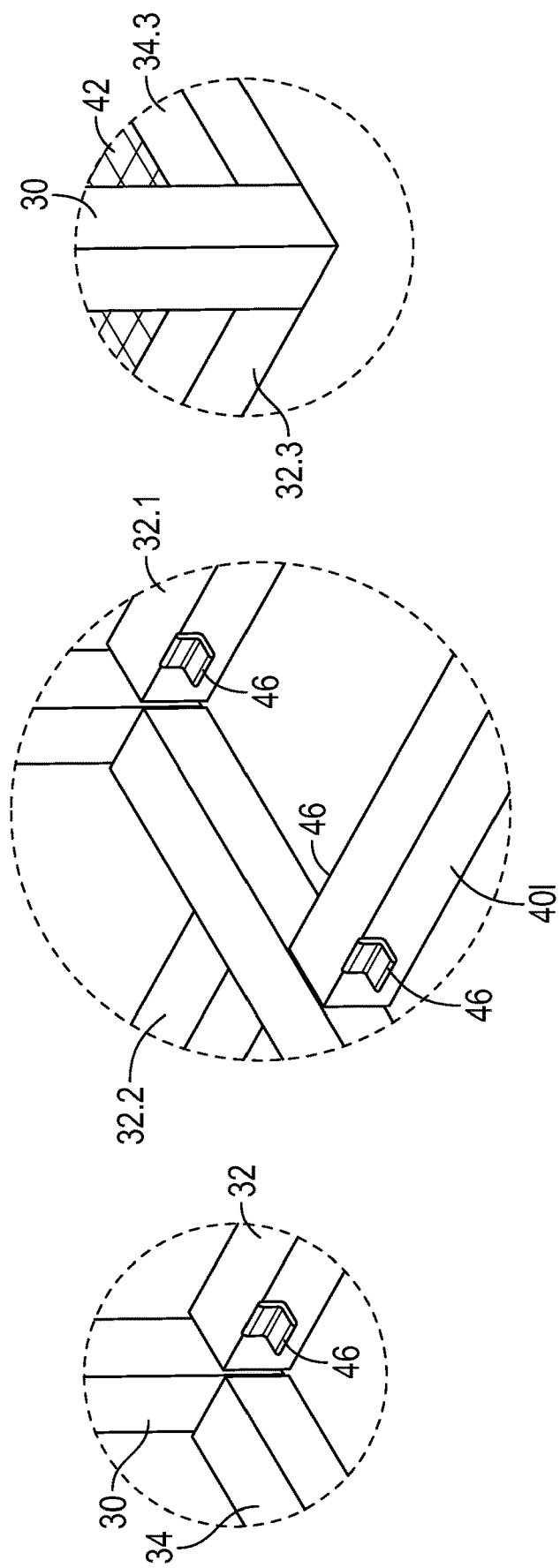

SUPPORT APPARATUS FOR PROPPANT STORAGE CONTAINERS

CROSS-REFERENCE TO RELATED APPLICATIONS

This application claims the benefit of U.S. Provisional Application No. 62/928,784, filed on Oct. 31, 2019. The entire disclosure of the above-referenced application is incorporated herein by reference.

TECHNICAL FIELD

The present disclosure relates a proppant discharge system for delivering proppant from a bulk storage container, and more particularly relates to a support apparatus configured to locate one or more modular proppant containers in an elevated position, deliver proppant to a feed station and accommodate various functional systems for efficient proppant delivery.

BACKGROUND

This section provides background information related to the present disclosure which is not necessarily prior art.

In the past several years, efforts have been made to improve logistics associated with the transportation, storage and delivery of proppant and other materials used onsite for fracturing operations at an oil/gas well, namely a fracturing site. In any hydraulic fracturing operation, a large amount of such proppant is required. Historically, it was been difficult to effectively transport and store the proppant at the fracturing sites. As a result, efforts have been made to load proppant into a modular container at a sand mine or transload facility, then transport the proppant-filled container to the fracturing site. Once onsite, the proppant-filled containers may be queued up at the fracturing site and proppant dispensed from the containers for use in the fracturing operation. Once emptied, the container may again be queued up at the fracturing site to transported back to the transload facility. Once proppant is material logistics and inventory management systems may be used to provide real-time, accurate information pertaining to the volume/inventory of proppant accessible to a user in a particular region or at a particular location.

Proppant conventionally used in fracturing operations must meet strict specification including moisture and turbidity requirements that require post-mining processes such as washing, screening and drying of the mined frac sand. Once so processed, proppant is relatively "slippery" and can be readily conveyed through handling equipment. Recent efforts to improve fracturing operations have focused on minimizing the post-mining processes of the fac sand by easing the specification for a suitable proppant. Therefore, there is a need to provide improved material handling equipment that is capable of conveying proppant having various characteristics.

SUMMARY

This section provides a general summary of the disclosure and is not a comprehensive disclosure of its full scope or all of its features.

A support apparatus for unloading a modular proppant container is disclosed herein. In one aspect the support apparatus includes a frame assembly having a base frame section, a plurality of posts extending upwardly from the base frame section and an upper frame section fastened to the plurality of posts in spaced relationship to the base frame assembly. The upper frame section provides an elevated load surface configured to support the modular proppant container in a position above a ground level. The base frame section includes a recessed region beneath the upper frame section providing a feed station. The support apparatus also includes a chute assembly supported by the frame assembly beneath the elevated load surface. The chute assembly includes a funnel section formed by a wall tapering from an inlet at a top of the wall subjacent to the elevated load surface to an outlet below the inlet, and a chute section extending downwardly from a first end at the outlet of the funnel section to a second end opposite the first end and terminating above the recessed region. The support apparatus further includes a gate actuator having a coupling configured to engage with a gate assembly of the modular proppant container supported on the elevated load surface and a drive mechanism extending between the frame assembly and the coupling to selectively position the coupling for adjusting the gate assembly.

In another aspect, the support apparatus a frame assembly includes an upper frame section and a plurality of posts fastened to the upper frame section in spaced relationship and extending downwardly therefrom. The upper frame section provides an elevated load surface configured to support the modular proppant container in a position above a ground level. The support apparatus also includes a chute assembly supported by the frame assembly beneath the elevated load surface. The chute assembly includes a funnel section formed by a wall tapering from an inlet at a top of the wall subjacent to the elevated load surface to an outlet below the inlet, and a chute section extending downwardly from a first end at the outlet of the funnel section to a second end opposite the first end and terminating at a feed station below the elevated surface. The support apparatus further includes a gate actuator including a coupling configured to engage with the gate assembly of a modular proppant container supported on the elevated load surface and a drive mechanism extending between the frame assembly and the coupling to selectively position the coupling for adjusting the gate assembly. The support apparatus further includes an on-board subsystem attached to the frame assembly for operating the support apparatus in a stand-alone mode. The on-board subsystem includes a controller configured to switch between a Sleep Mode in which the on-board subsystem is not operational and consumes little to no power and an On Mode in which the on-board subsystem is fully powered and operational.

In another aspect, the support apparatus includes a frame assembly having an upper frame section and a plurality of posts fastened to the upper frame section in spaced relationship and extending downwardly therefrom. The upper frame section includes two longitudinal beams and two cross beams forming a rectangular container bay configured to support the modular proppant container in a position above a ground level. The support apparatus also includes an in-situ weigh station configured to measure the weight of the modular proppant container supported on an elevated surface in the rectangular container bay. The in-situ weigh station includes a scale located at each corner of the rectangular container bay. Each scale has a base plate rigidly attached to the upper frame section and a load cell positioned on top of the base plate. The in-situ weigh station also include a weighing platform having an upper plate resting on top of the load cell at each corner of the rectangular container bay and a rectangular frame extending between the upper plate of adjacent load cells. The in-situ weigh station further includes a load cell processor configured to receive an input data signal from each load cell representing the vertical load between the base plate and the upper plate, compute a total weight on the in-situ weigh station and send an output data signal representing the total weight. The support apparatus further includes a chute assembly supported by the frame assembly beneath the elevated load surface. The chute assembly has a funnel section formed by a wall tapering from an inlet at a top of the wall subjacent to the elevated load surface to an outlet below the inlet and a chute section extending downwardly from a first end at the outlet of the funnel section to a second end opposite the first end and terminating at a feed station below the elevated surface. The support apparatus additional includes a gate actuator having a coupling configured to engage with the gate assembly of a modular proppant container supported on the elevated load surface and a drive mechanism extending between the frame assembly and the coupling to selectively position the coupling for adjusting the gate assembly.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
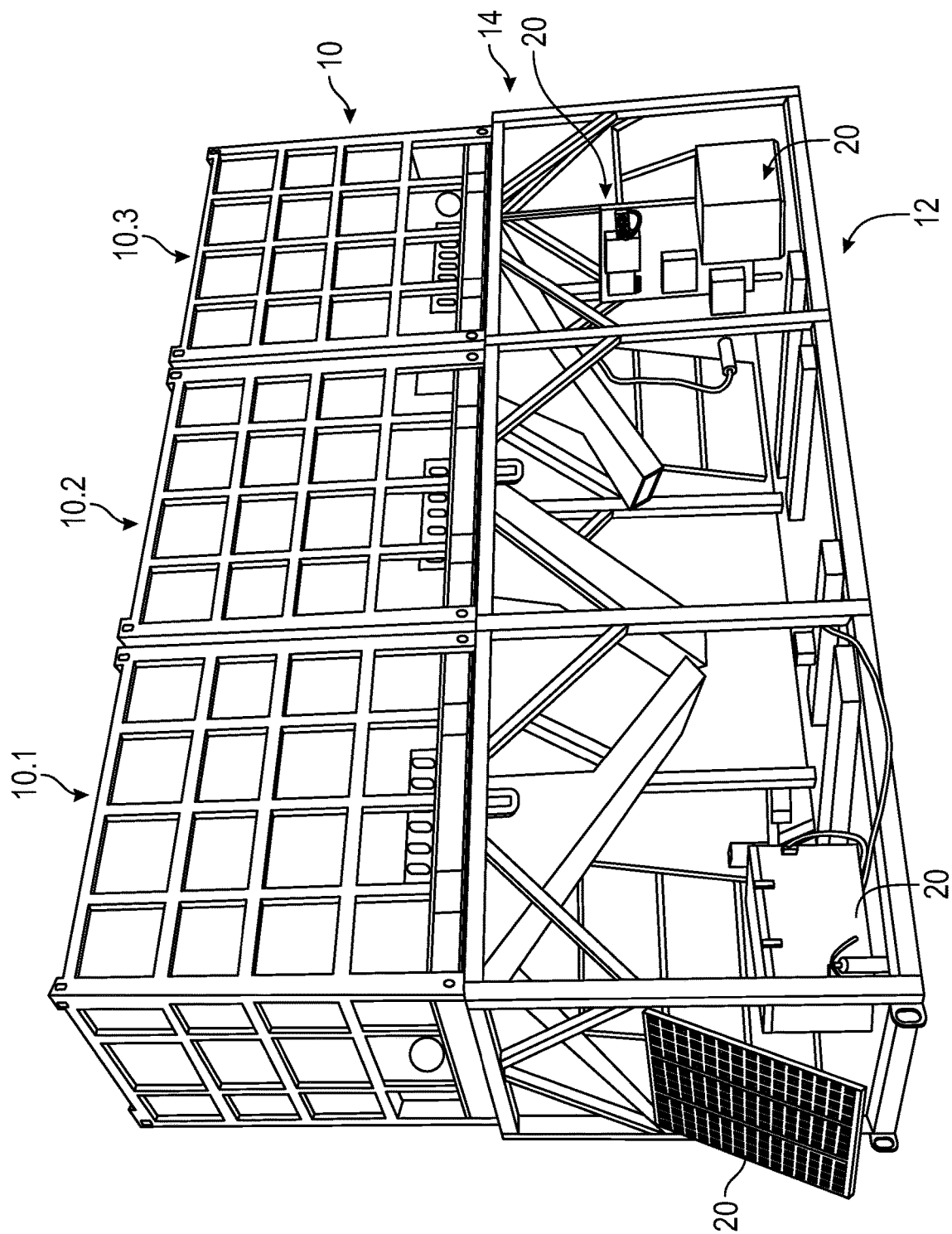
FIG. 1 is a front-left perspective view showing a support apparatus with a plurality of proppant containers located in an elevated position on the support apparatus.
Figure 2:
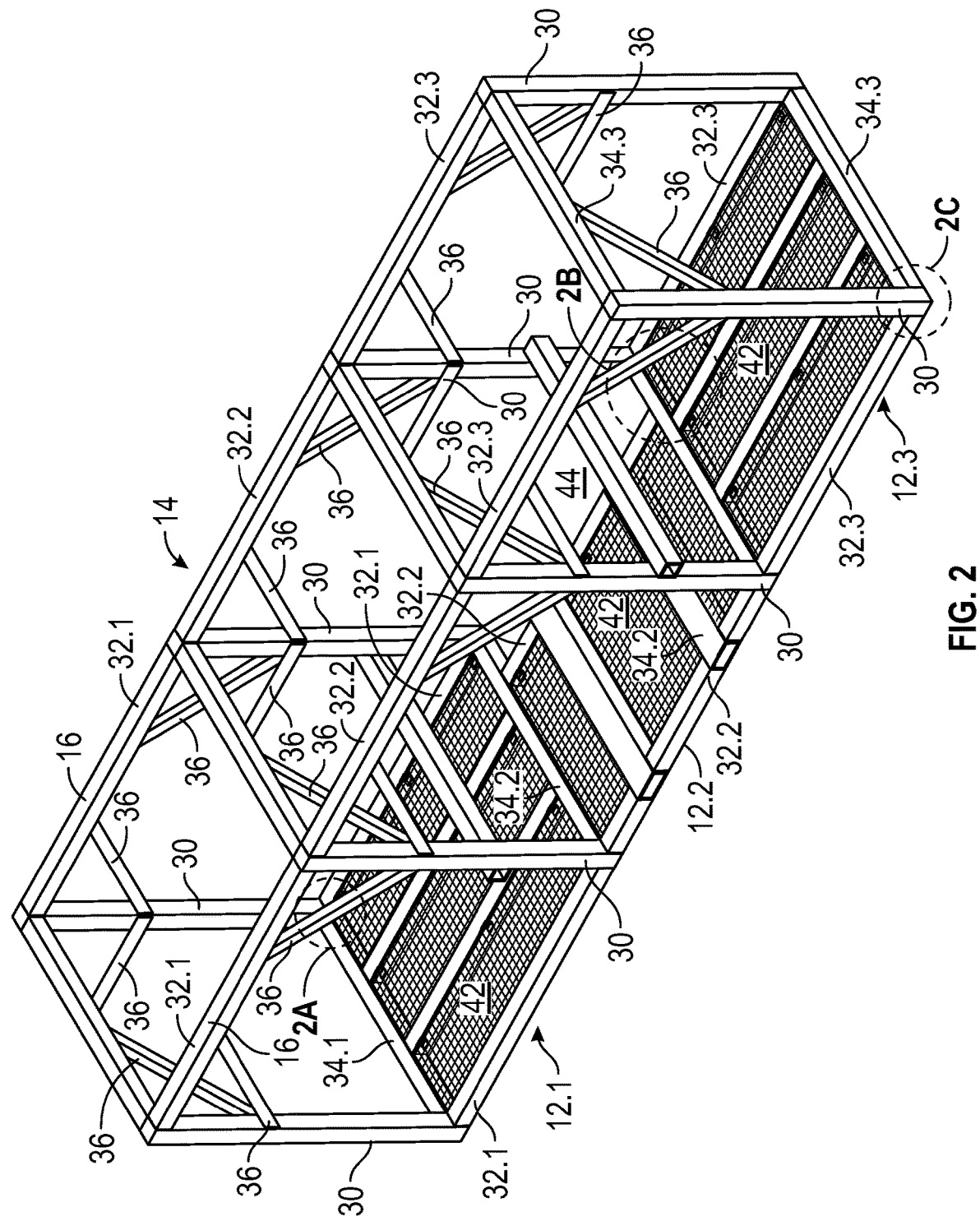
FIG. 2 is a perspective view of a frame assembly for the support apparatus with FIGS. 2A-2C showing details of joint configuration at various locations (A-C) of the frame shown in FIG. 2.

With reference to FIG. 1, a plurality of proppant containers 10 are shown supported on a support apparatus 12 in an elevated position above ground level. The proppant containers 10 provide for the bulk storage of proppant or fracturing sand and are readily transportable to and from a well site. A presently preferred embodiment of each proppant container 10 is disclosed in U.S. Pat. No. 9,809,381 to Oren et al., which is expressly incorporated by reference herein. As Oren et al. describe therein, each proppant container includes a gate assembly which is selectively positionable between a closed position and an open position for metering proppant sand from the proppant container.

The support apparatus 12 includes a frame assembly 14 defining an elevated load surface 16 for the proppant containers 10 and a chute assembly 18.1, 18.2, 18.3 (collectively 18) located beneath for each of the proppant containers for directing proppant discharged from the proppant containers to a feed station. The feed station is a target site such as a blender hopper or proppant conveyor assembly for further handling of the proppant in the fracturing operation. One skilled in the art should recognize that the support apparatus 12 as described herein may be configured for one or more modular proppant containers. For example, in the embodiment illustrated in FIG. 1, the support apparatus 12 is configured with three bays or sections 12.1, 12.2, 12.3 for supporting three proppant containers 10.1, 10.2, 10.3 and therefore include three chute assemblies 18.1, 18.2, 18.3.

The support apparatus 12 also includes various on-board subsystems 20 associated with the frame assembly 14. The on-board subsystems 20 may include power supply subsystem having solar panels and/or battery banks as well as power conditioning circuitry for electrically powering the support apparatus, a hydraulic subsystem having a hydraulic pump, a fluid storage tank and a hydraulic for manipulating components of the support apparatus, and a vision subsystem for remotely monitoring the operational state of the support apparatus. These on-board subsystem also include subsystem controllers for operating the on-board subsystems 20 of the support apparatus 12. These on-board subsystems 20, which will be described in greater detail below, enable the support apparatus 12 to be used in a stand-alone or self-sufficient mode of operation that does not require separate or remote utilities such as an external power supply or external pneumatic or hydraulic power source. In this way, the support apparatus 12 physically supports modular containers for discharging proppant to a feed station and also operationally supports the functions of the process by providing electrical, pneumatic and hydraulic power for the support apparatus 12.

With reference now to FIGS. 2-6, the frame assembly 14 is fabricated using tubular steel members including vertical posts 30, longitudinal beams 32 and cross beams 34 welded together in a three-dimensional rectangular configuration. Diagonal beams 36 extend between the vertical posts 30 and the upper longitudinal beams 32.1, 32.2, 32.3 (collectively referred to as 32) as well as the vertical posts 30 and the upper cross beams 34.1, 34.2, 34.3 (collectively referred to as 34) to enhance the rigidity of the frame assembly 14 by triangulating the joints between these tubular steel members.

Figure 3:
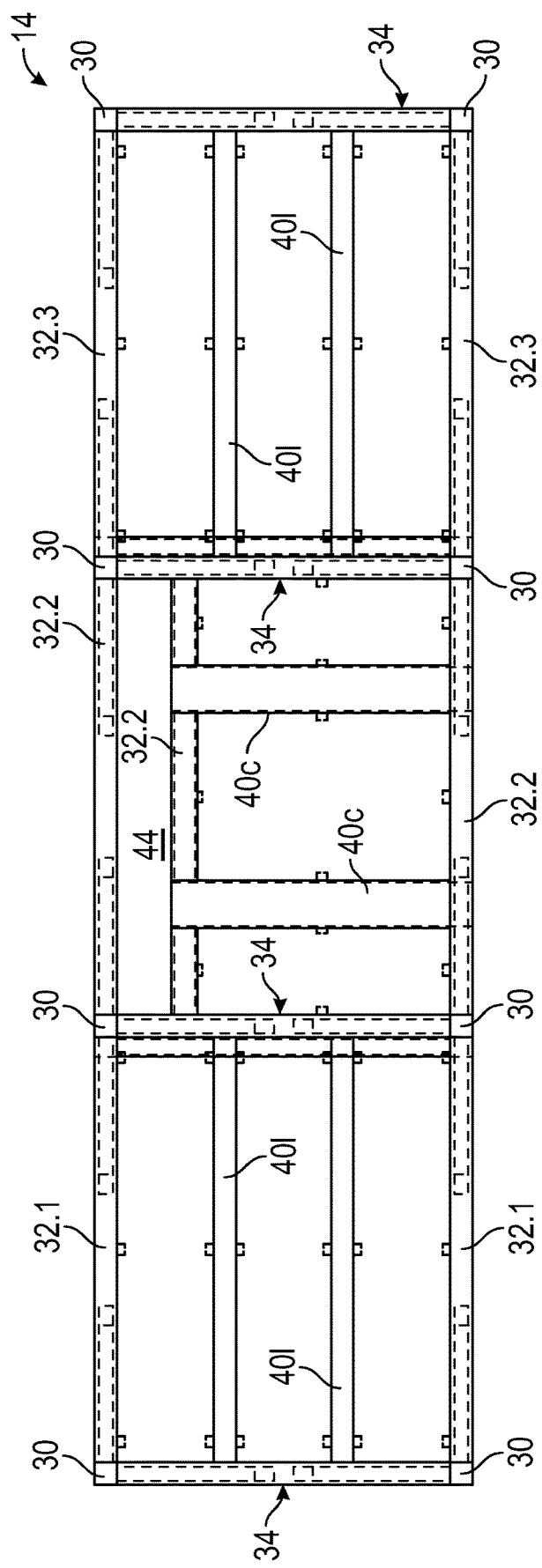
FIG. 3 is a plan view of the frame shown in FIG. 2.
Figure 4:
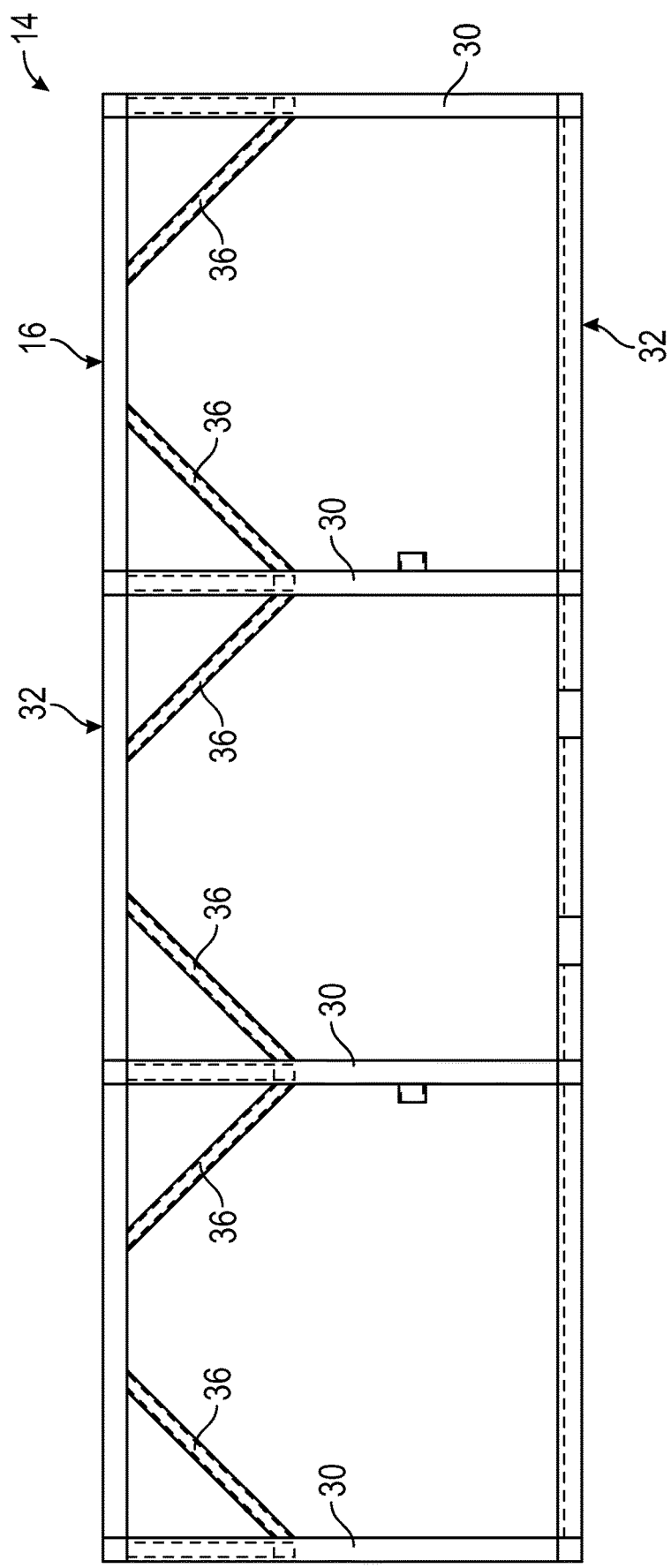
FIG. 4 is a front view of the frame shown in FIG. 2.
Figure 6:
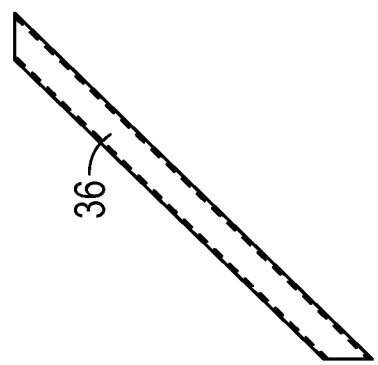
FIG. 6 is a detail view of a diagonal frame member.
Figure 5:
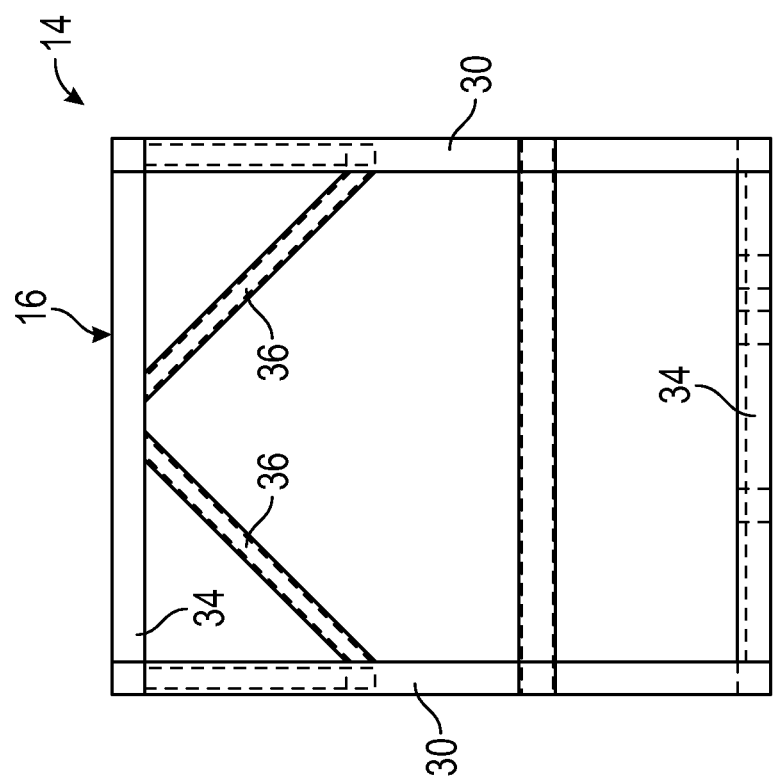
FIG. 5 is a right elevation of the frame shown in FIG. 2.

An upper frame section includes upper longitudinal beams 32 and the upper cross beams 34 providing the elevated load surface 16 for supporting the proppant containers 10. The lower longitudinal beams 32 and lower cross beams 34 define a base frame section or simply base 38 of the frame assembly 14. The right and left bays 12.1, 12.3 include a pair of intermediate longitudinal beams 40*l* extending between the lower cross beams 34 to provide additional floor support at the base of the support apparatus 12. As illustrated in the figures, the middle bay 12.2 includes a pair of intermediate cross beam 40 secured to a top surface of the lower longitudinal beams 32.2 and extending therebetween. The intermediate cross beams 40*c* are configured to receive a pair of forks extending from a fork lift vehicle for lifting and locating the support apparatus 12 at a well site. In another embodiment, the intermediate cross beams 40*c* may be secured to a bottom surface of the upper longitudinal beams 32.2 in the middle bay 12.2. A sheet material 42 may be fastened to the base 38 on the top of the beams 32, 34, 40*l*, 40*c* forming a floor of the support apparatus 12. As best seen in FIG. 3, the longitudinal beam 32.2 of the middle bay 12.2 is located inboard relative to the longitudinal beams 32.1, 32.3 of the right and left bays 12.1, 12.3 to provide a cut-out or recessed region 44 in the frame assembly 14. This recessed region 44 is configured to receive a hopper for fracturing equipment such as a blender or similar equipment (not shown). In this regard, the recessed region provides a feed station for proppant being discharged from the proppant containers 10. In other words, the frame assembly 14 has a recessed region 44 formed therein so that the support structure can be located at least partially above the feed station.

Figure 8:
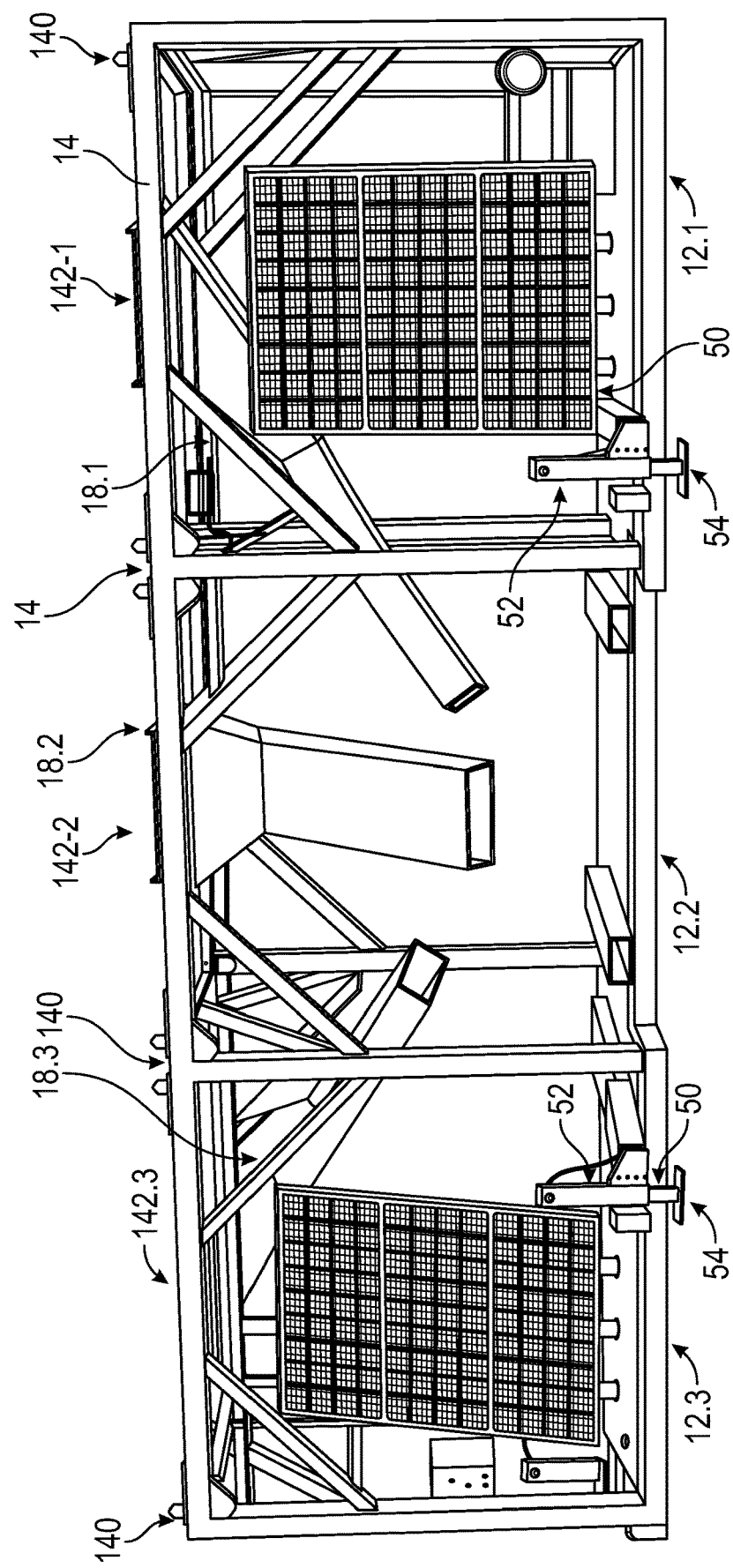
FIG. 8 is a rear perspective view of the support apparatus shown in FIG. 7.
Figure 9:
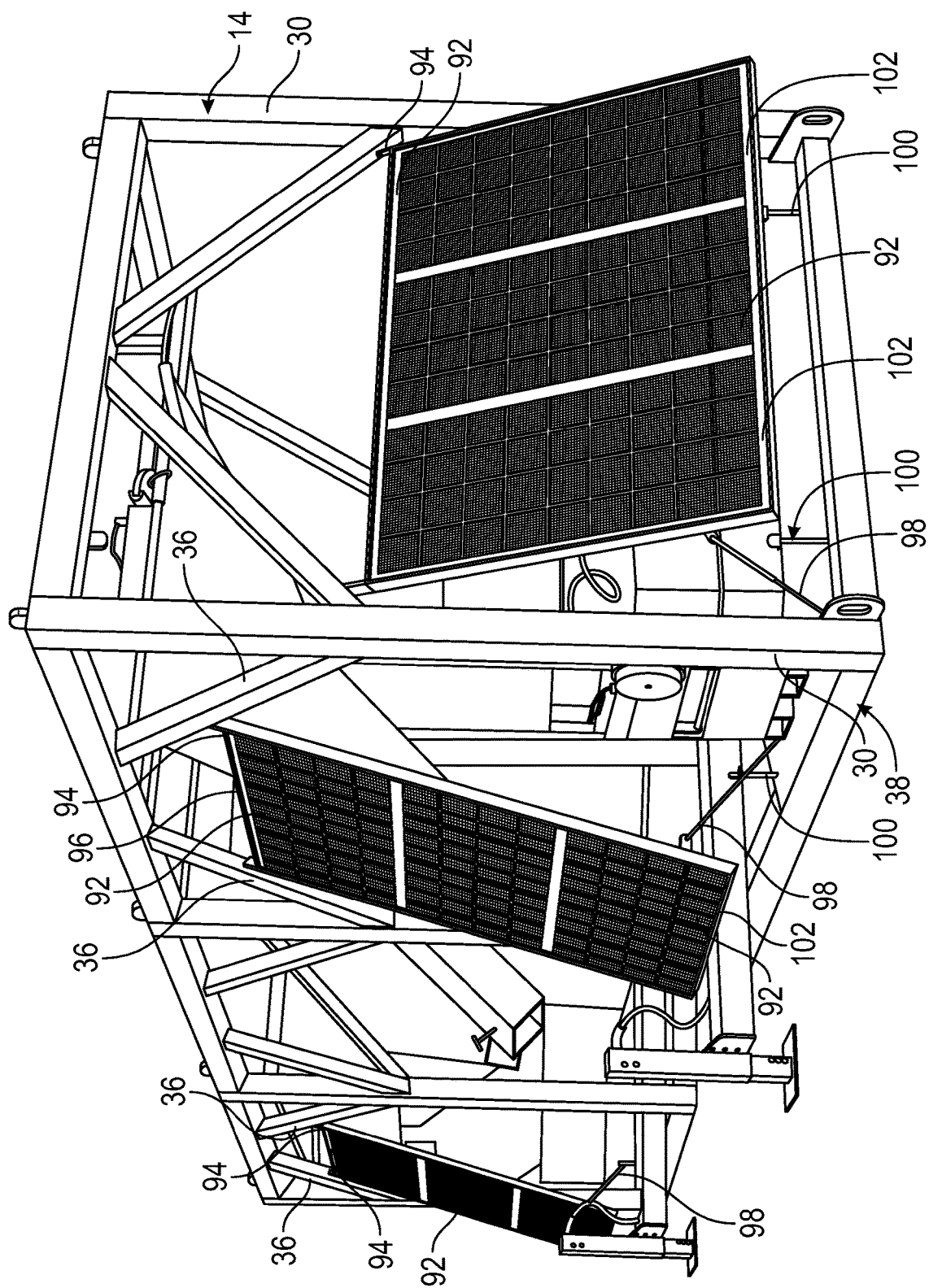
FIG. 9 is a rear-right side perspective view of the support apparatus shown in FIG. 7.

The frame assembly 14 may optionally include additional structural elements such as tabs 46 shown in detail 2A and 2B for attached items like sheet material 42 to the beams 32, 34 or cross members 48 to provide additional rigidity and/or attachment locations for the on-board subsystems 20 of the support apparatus 12. As illustrated in the figures, the sheet material 42 is a metal flooring grid, however one skilled in the art will appreciate that the sheet material 42 may be formed with other materials such as a plastic or composite material and/or be configured in a manner other than a flooring grid such as a diamond plate or other anti-slip sheet material. As presently preferred, the frame assembly 14 further includes a pair of outriggers 50 extending from one of the lower longitudinal beams 32 beyond the base 36. For example, as best seen in FIGS. 8-9, the outriggers 50 extend from the rear lower longitudinal rail of right and left bays 12.1, 12.3. A leveling jack 52 is disposed at the end of each outrigger 50 and has a height adjustable foot 54 that can be positioned to stabilize and level the frame assembly in a stationary position. As illustrated, the leveling jacks 52 is hand operated to raising and lowering the foot 54 relative to the outrigger 50. One skilled in the art should, however, recognize that the leveling jack may be motorized or hydraulically actuated for raising and lowering the foot 54.

With reference to FIGS. 7-10, the chute assembly 18 and the on-board subsystems 20 will be further described. As previously explained, there is a chute assembly 18.1, 18.2, 18.3 associated with each bay 12.1, 12.2, 12.3 respectively. The various structure and function of each chute assembly is sufficiently similar that each chute assembly will be described by reference to chute assembly 18.1 shown in FIG. 8. The chute assembly 18.1 includes a funnel section 56, a chute section 58 and a gate actuator 60. The funnel section 56 is formed by a wall 62 tapering from an inlet or opening 64 at the top of the wall subjacent to the elevated load surface 16 to an outlet 66 below the inlet 64. As illustrated, the funnel section 56 forms an inverted, truncated pyramid but may be formed by other similar shapes that provide a funneling function from the inlet to the outlet. The chute section 58 extends downwardly from a first end 68 at the outlet 66 of the funnel section 56 to a second end 70 opposite the first end 68 and terminating above the recessed region 44 of the frame assembly 14. As illustrated, the chute section 58 includes an upper chute 72 secured to the funnel section and a lower chute 74 slidably supported on the upper chute 72. An actuator 76, in the form of a mechanical slide, is operably coupled between the upper and lower chutes 72, 74 so that the overall length of the chute section 58 can be adjusted by sliding the lower chute 74 along the longitudinal axis of the upper chute 72. One skilled in the art should recognize that the actuator 76 may take other forms such as a motor-driven slide, an electric ram, or a hydraulic or pneumatic or electric actuator. In these embodiments, the actuator 76 may include a limit switch for restricting the relative movement of the upper and lower chutes 72, 74.

Figure 11:
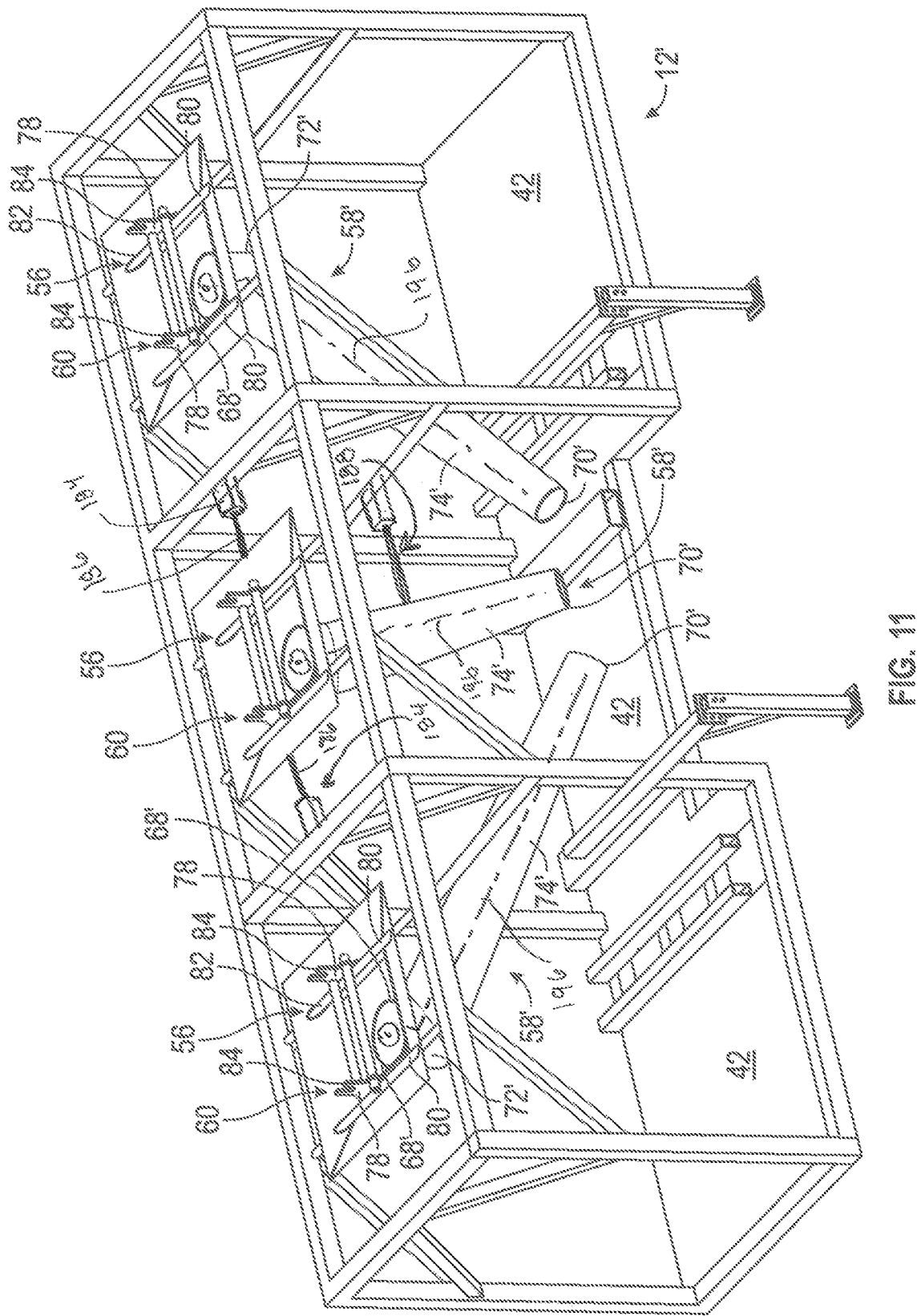
FIG. 11 is a rear-left perspective view of the support apparatus according to a second embodiment.
Figure 12:
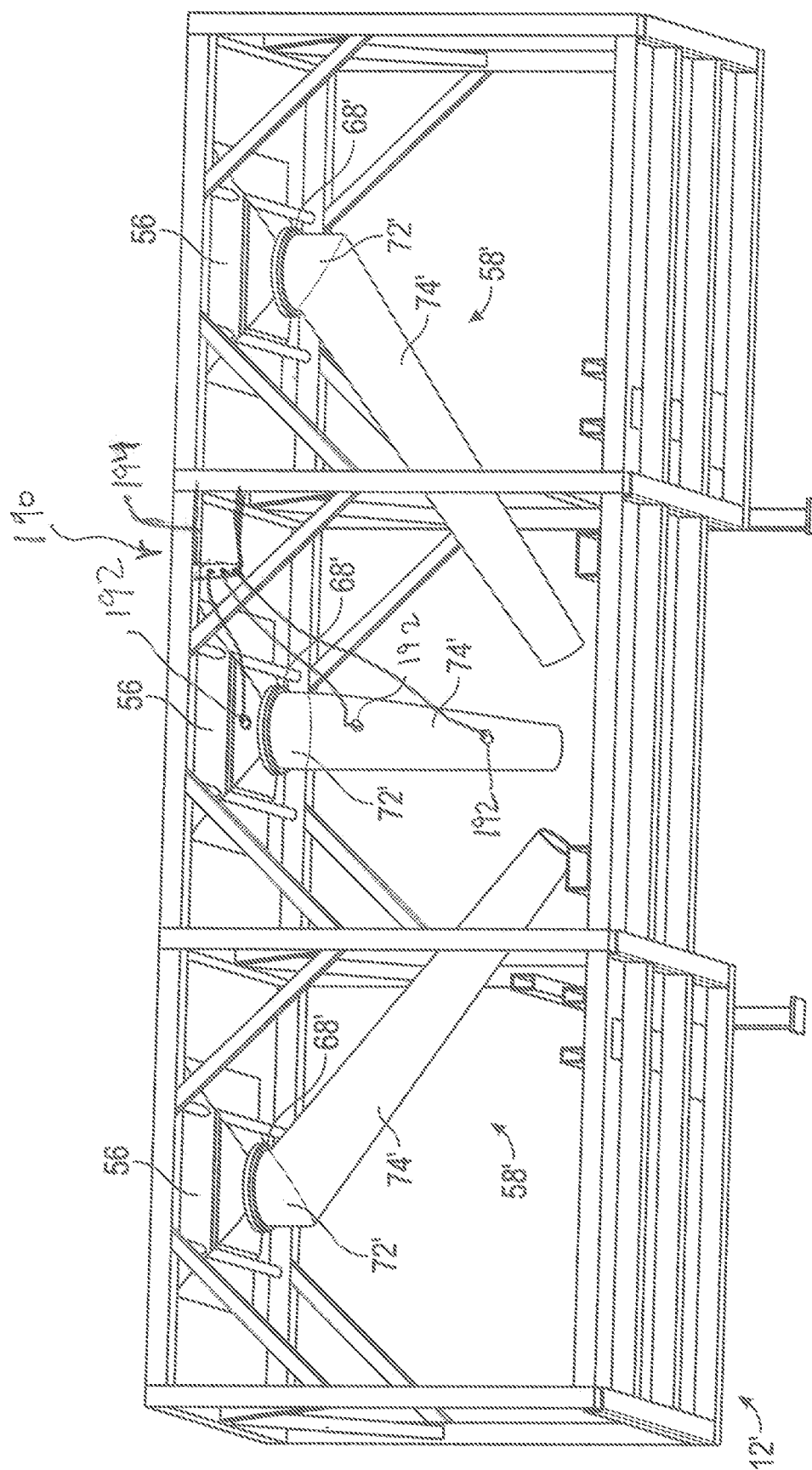
FIG. 12 is a front perspective view of the support apparatus shown in FIG. 11
Figure 13:
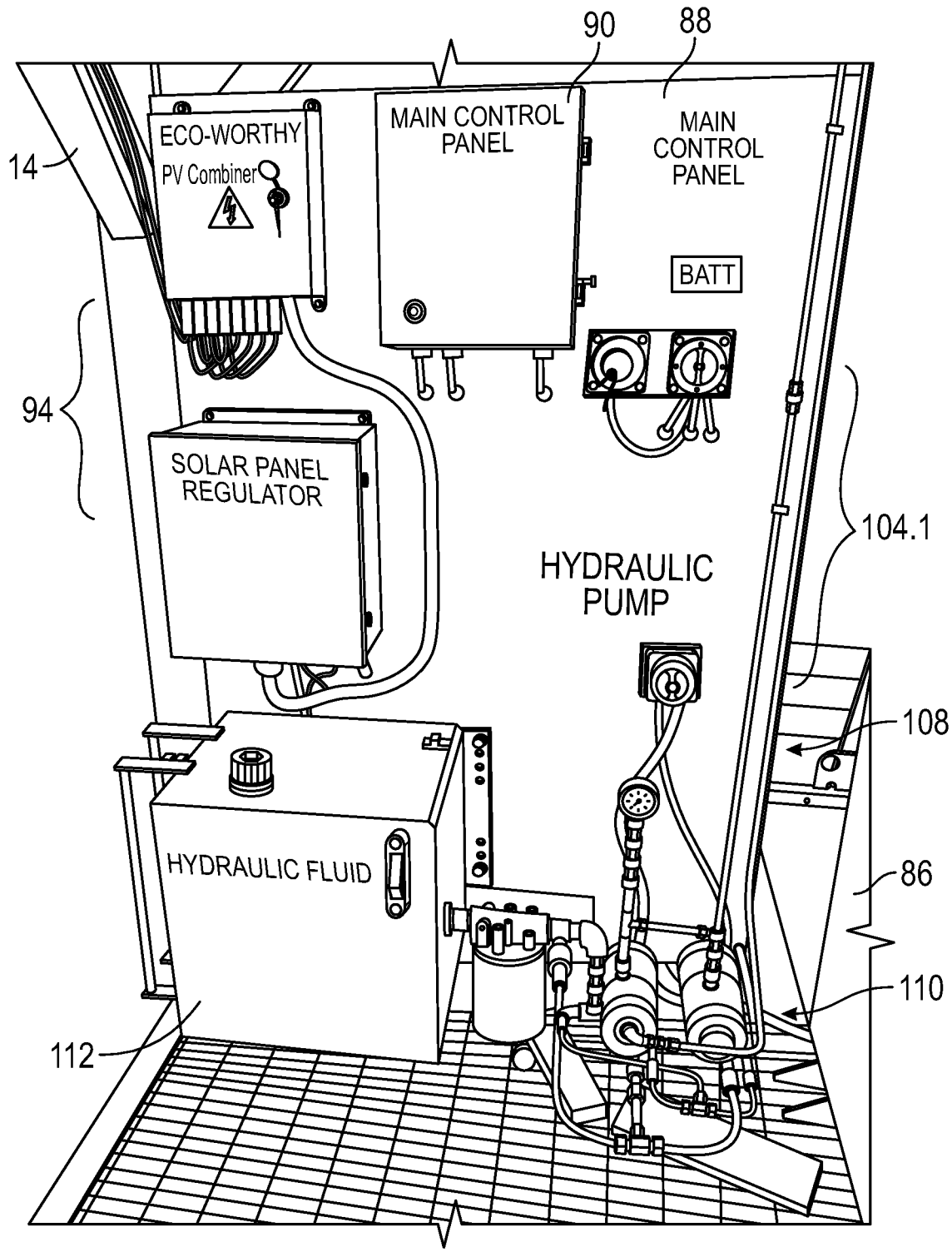
FIG. 13 illustrates a main control panel with on-board systems of the support apparatus.

FIGS. 11-12 illustrate an alternate embodiment of a support apparatus 12' in which the chute section 58' includes a cylindrical upper chute 72' extending from the funnel section 56' at the first end 68' and a truncated conical lower chute 74' extending from the upper chute 72' and terminating at the second end 70'. As illustrated, the length of the chute section 58' is not adjustable, but an angular orientation of the chute section 58' relative to the funnel section 56' may be adjustable by providing a bearing or similar rotating interface at the first end 68' between the funnel section 56' and the chute section 58'.

In some applications, proppant stored in the container 10 and dispensed with the support apparatus 12, 12' may have a higher moisture or turbidity than conventional proppant that has been dried in post-mining operations. It may be beneficial to specifically configure the support apparatus for these circumstances. For example, portions of the support apparatus 12, 12' may be fabricated using a stainless steel material or plastic for providing a slipperier surface than if fabricated using mild steel. In particular, the funnel section 56, 56' and/or the chute section 58, 58' may be fabricated from stainless steel or plastic. Alternately and/or additionally, the interior surfaces of these sections may be coated with a low friction coating such as a PTFE or similar non-stick coating for reducing the coefficient of friction of the interior surfaces.

Figure 7:
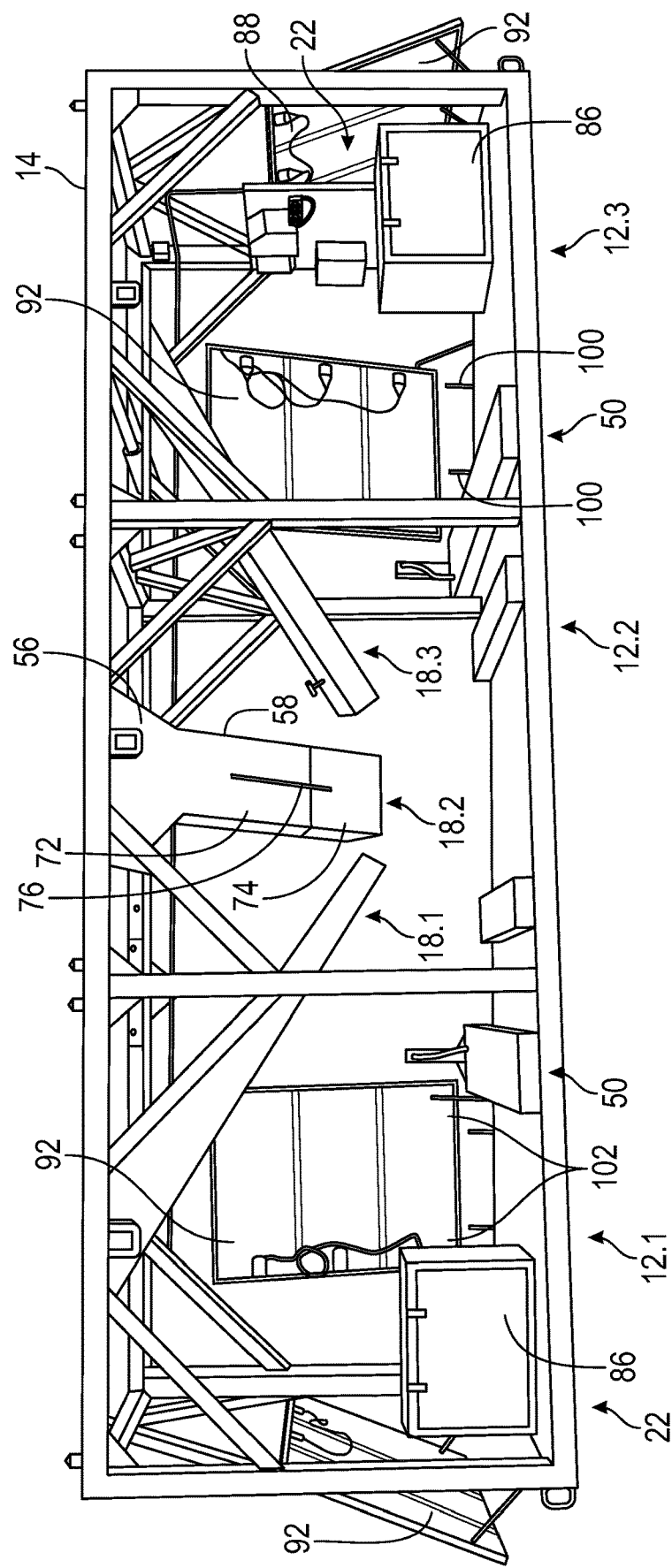
FIG. 7 is a front perspective view of the support apparatus according to a first embodiment.
Figure 10:
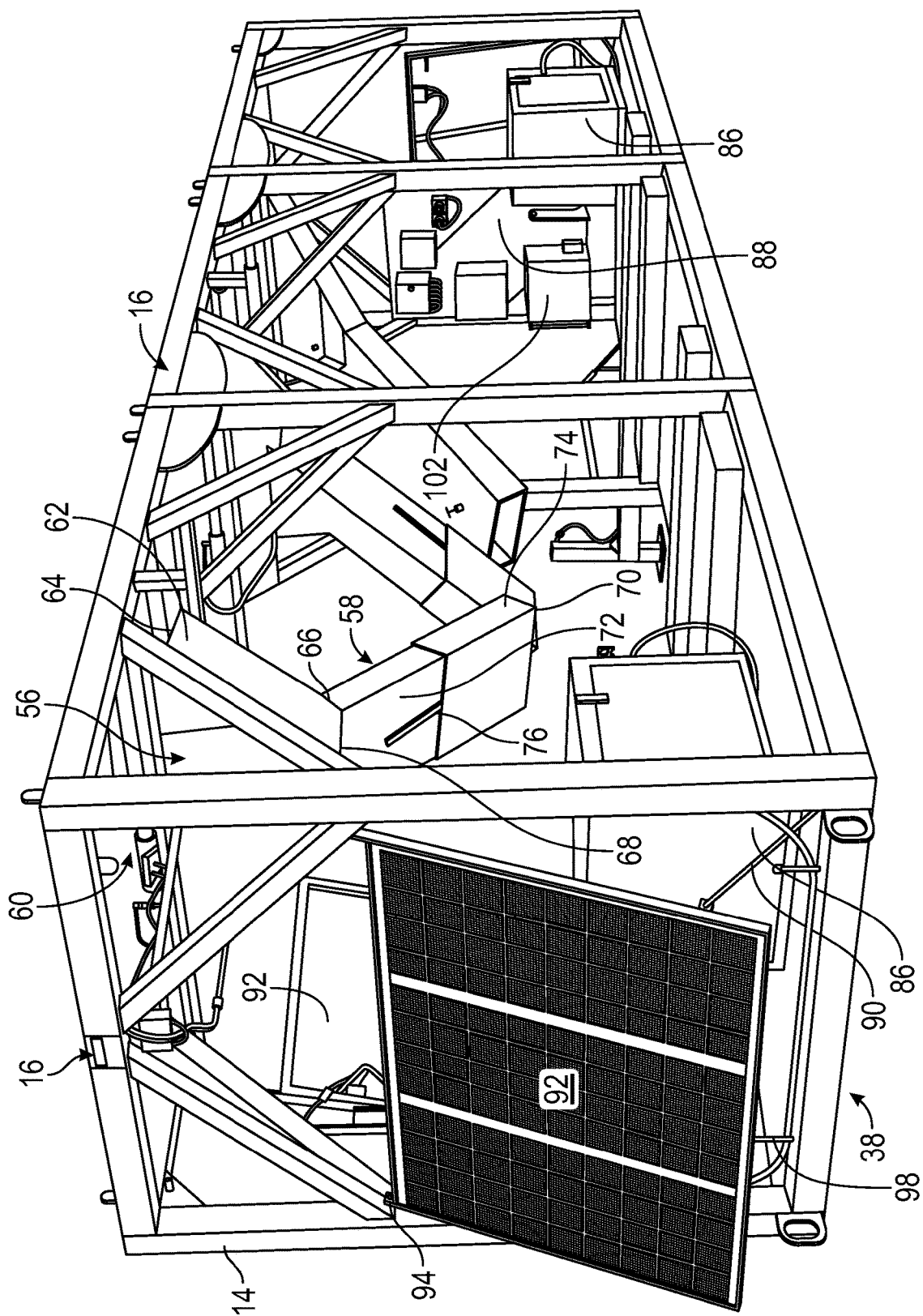
FIG. 10 is a front-left perspective view of the support apparatus shown in FIG. 7

Additional features may be used to promote gravity feeding proppant from containers 10 positioned on the support apparatus 12, 12' to the feed station. One such feature includes a shaker or vibration mechanism 184 operably coupled between the frame assembly 14, 14' and the funnel section 56, 56' and/or the chute section 58, 58' for gently vibrating these components as proppant discharged from the container 10. For example, in an embodiment as shown in FIG. 11, the vibration mechanism 184 may include one or more actuators 186 operably coupled between the frame assembly 14' and the funnel section 56' for linearly, orbitally or rotationally vibrating the funnel section 56' to shake loose any proppant that may have become lodged or stalled therein. While the vibration mechanism 184 is only illustrated in the center bay of frame assembly 14', one skilled in the art should appreciate that the other bays of frame assembly 14' or frame assembly 14 may be similarly equipped with a vibration mechanism. Likewise, in an embodiment illustrated in FIG. 11, an actuator 188 may be operably coupled between the frame assembly 14' and the lower chute section 74' to shake loose any proppant that may have become lodged or stalled therein. While actuator 188 is only illustrated in the center bay of frame assembly 14, one skilled in the art should appreciate that the other bays of frame assembly 14 or frame assembly 14' may be similarly equipped with a vibration mechanism. Alternately, the actuator 76, which in reference to FIGS. 7 and 10 is used to adjust the length of the chute assembly 58, may also be actuated to vibrate the chute assembly 58 by moving the lower chute 74 relative to the upper chute 72. Actuators 186, 188 may be an electro-mechanical, pneumatic, or hydraulic component. In such applications, the funnel section 56, 56' and/or the chute section 58, 58' may be resiliently supported from the frame assembly 14, 14' to accommodate relative movement therebetween. The amount of shaking movement required may be determined based on the moisture content, turbidity and mesh size of the proppant being discharged from the support apparatus 12, 12'.

Another such feature may include an aeration mechanism 190 for injecting a quantity of compressed air or similar fluid stream into proppant being discharged from the container 10. For example, as shown in FIG. 12, one or more air injectors 192 coupled to a source of compressed air 194 may be located adjacent the funnel section 56' and/or in the chute section 58' for transporting proppant being discharged from the container in a fluid stream. In so doing, proppant exiting the container 10 is fluffed up to reduce the density of the transported material thereby reducing the likelihood of clumping or clogging of proppant. Alternately, a feed mechanism 196 may be implemented along the proppant transport path from the container 10 to the feed station. For example, the feed mechanism 196, represented by the broken line in FIG. 11 may be configured in the funnel section 56' of the support apparatus 12, 12' and/or along the chute section 58'. In an embodiment, the feed mechanism 196 is an auger device that moves proppant discharged from the container 10 into and through the funnel section 56, 56' and/or though the cute section 58, 58' to the feed station. In other embodiments, a conveyor belt, paddle wheel, air stream or similar devices may be implemented for transporting proppant from the funnel section 56' through the chute section 58'. While aeration mechanism 190 and the feed mechanism 196 are only illustrated in the center bay of frame assembly 14', one skilled in the art should appreciate that the other bays of frame assembly 14' or frame assembly 14 may be similarly equipped with an aeration mechanism or feed mechanism.

Figure 15:
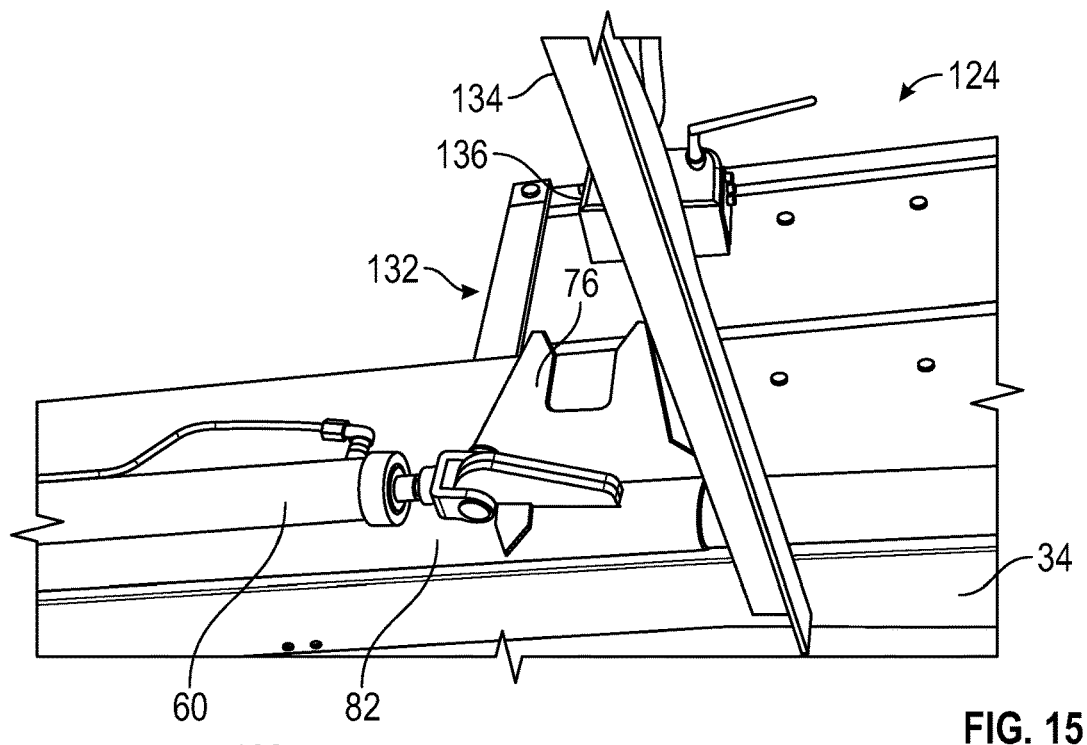

With continued reference to FIGS. 10-11 and 15, the gate actuator 60 is illustrated. The gate actuator 60 includes a coupling 78 supported on a slide or rail 80 positioned at or adjacent to the elevated load surface 16 extending over the funnel section 56, 56'. A linear actuator 82 is operably coupled between the frame assembly 14 and the coupling 78. As best seen in FIGS. 11 and 15, the coupling 78 is configured as a receptacle having a slot 84 formed in the top end thereof. The slot 84 receives a pin (not shown) on the gate assembly of a proppant container 10 supported on the elevated load surface. With the gate assembly coupled to the coupling 78, the actuator 82 functions as a drive mechanism for selectively positioning the coupling 78 (and its received pin) to adjust the gate assembly on the proppant container between the closed and opened position and meter proppant therefrom.

Figure 16:
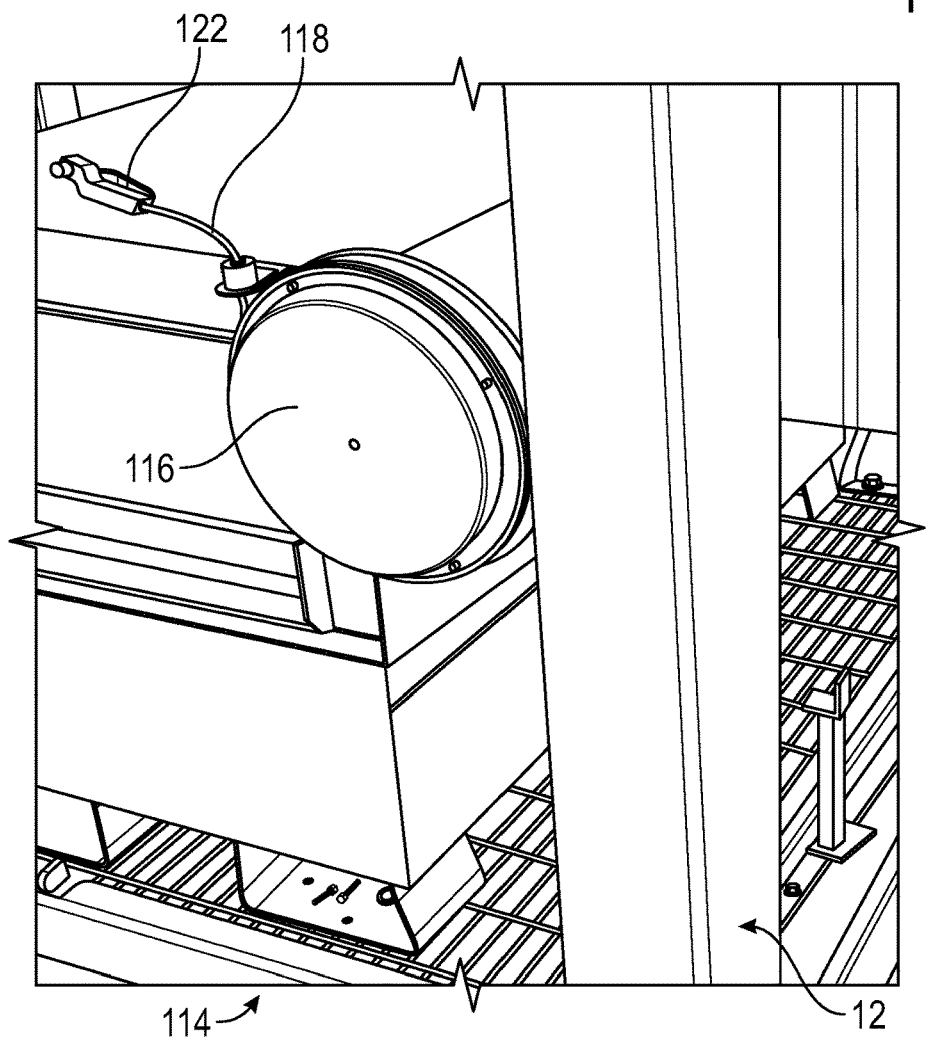
FIGS. 16-17 illustrate an electrical grounding system for the support apparatus.
Figure 17:
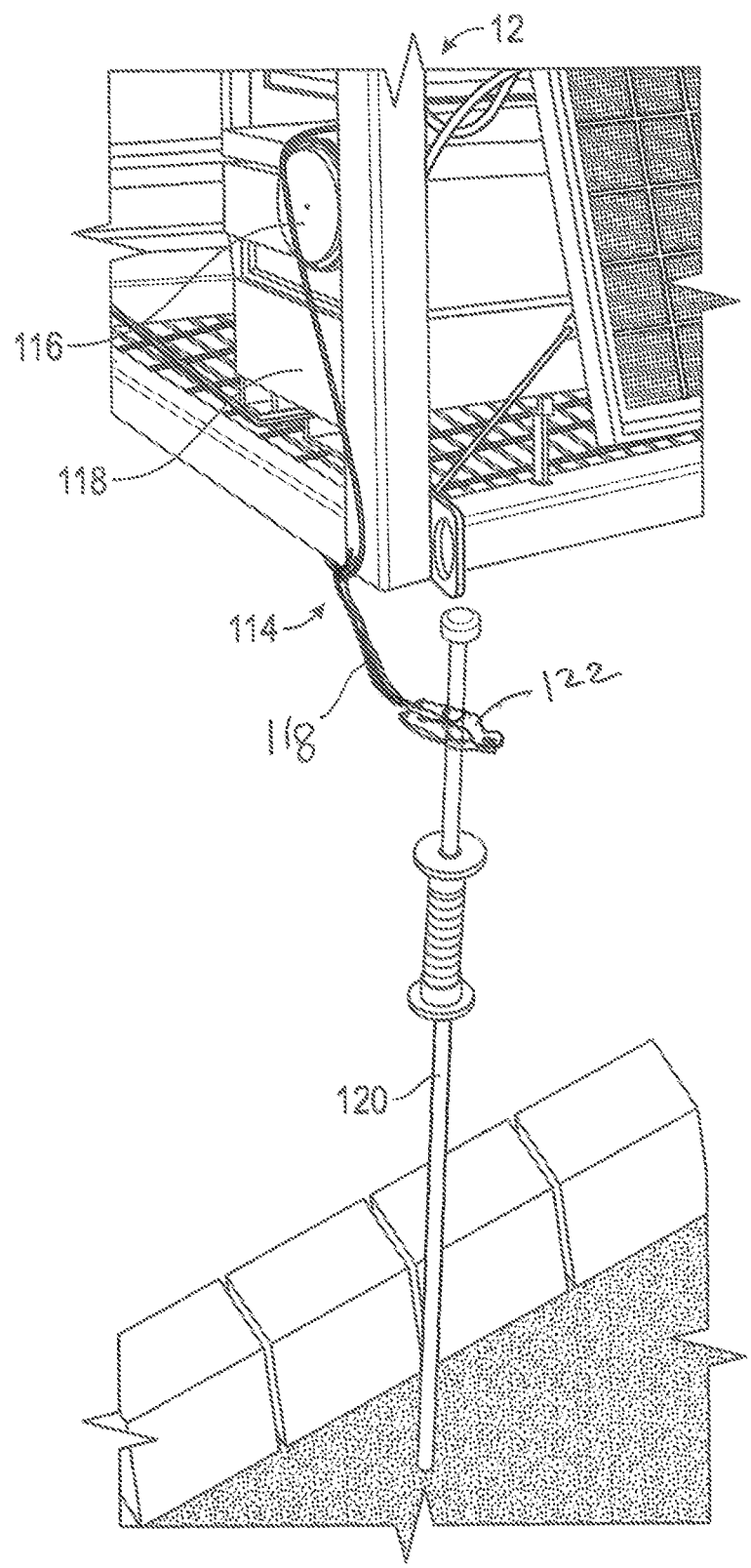
Figure 18:
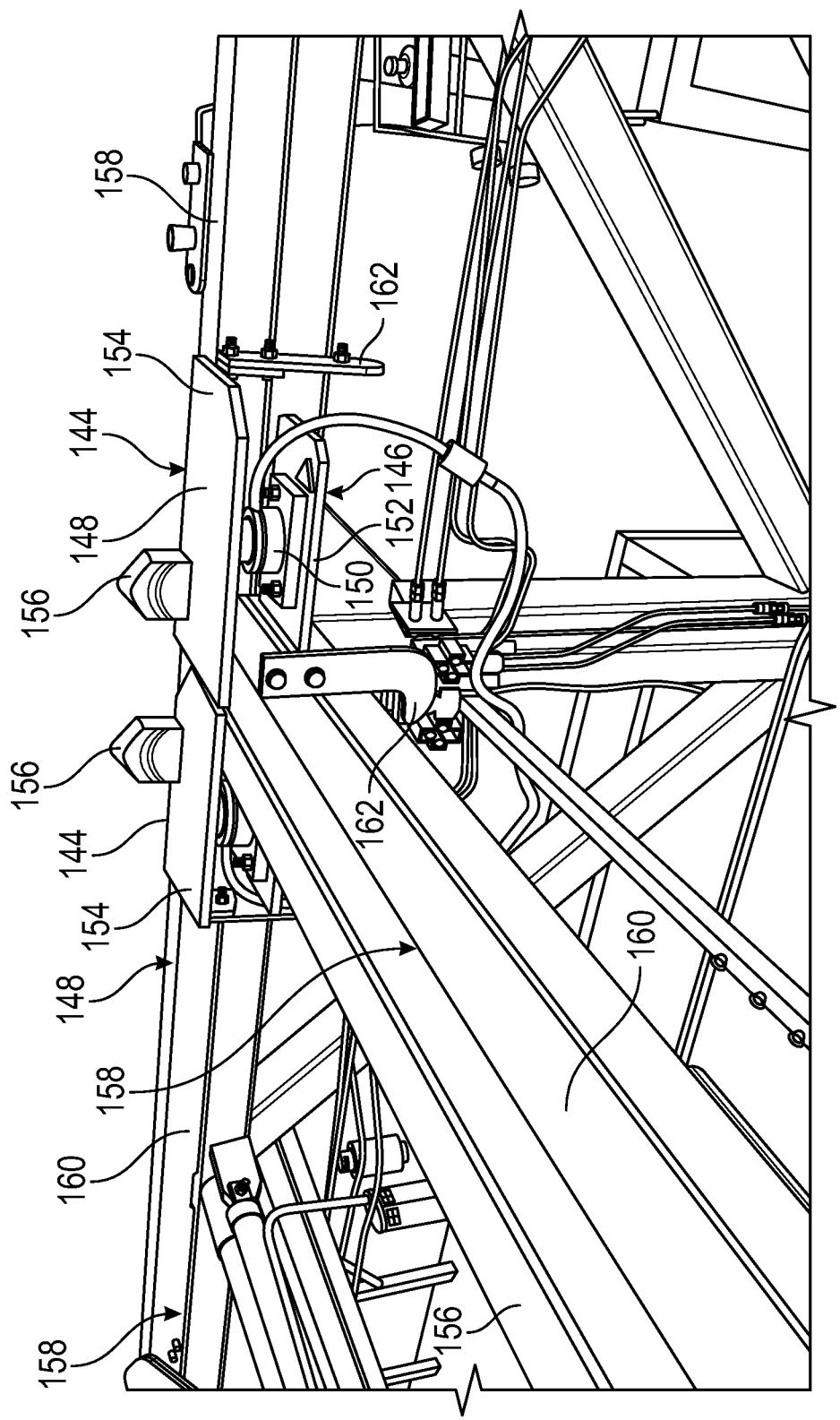
FIGS. 18-21 illustrate a weigh scale system for measuring the weight of a proppant container supported on the support apparatus.
Figure 19:
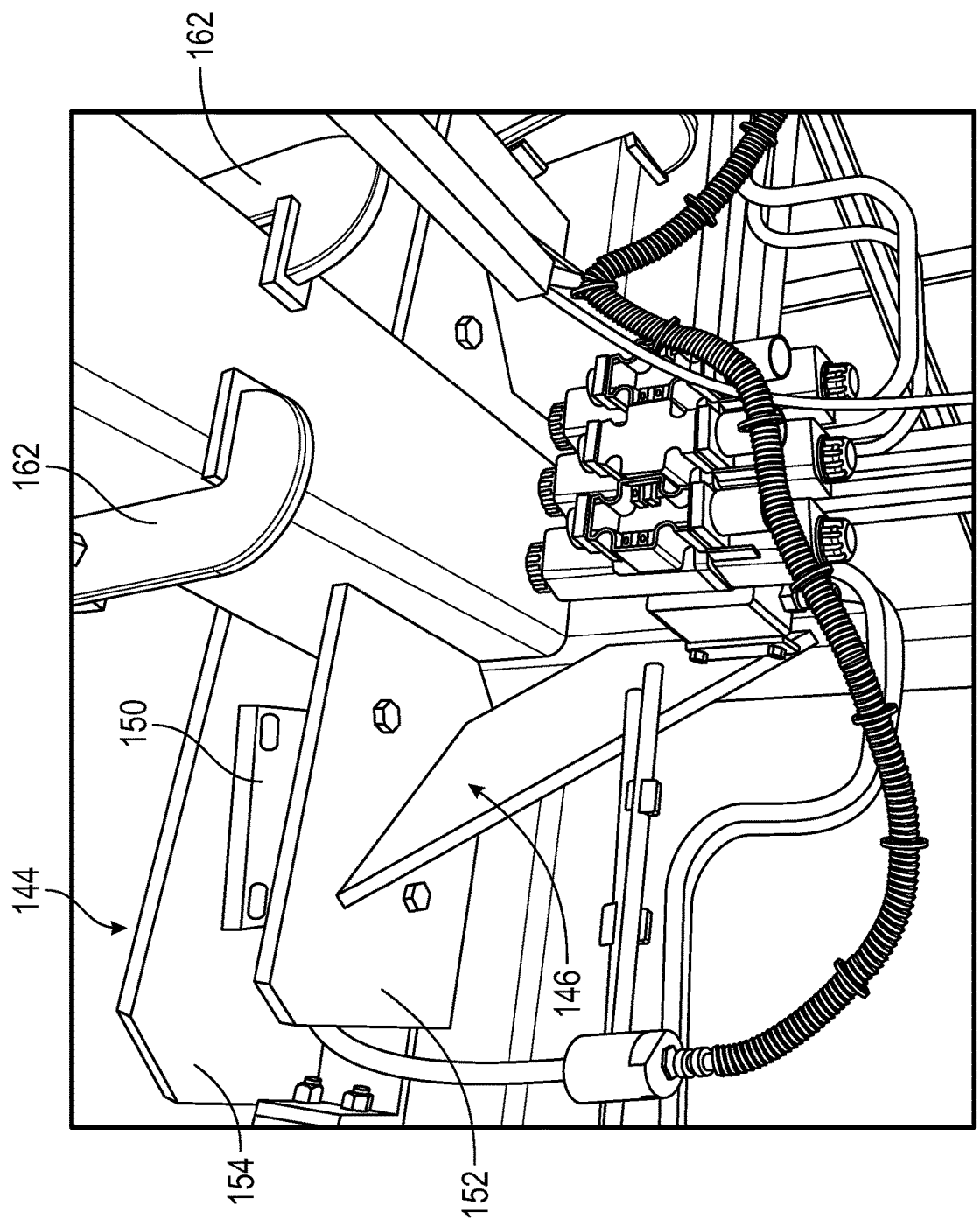
Figure 21:
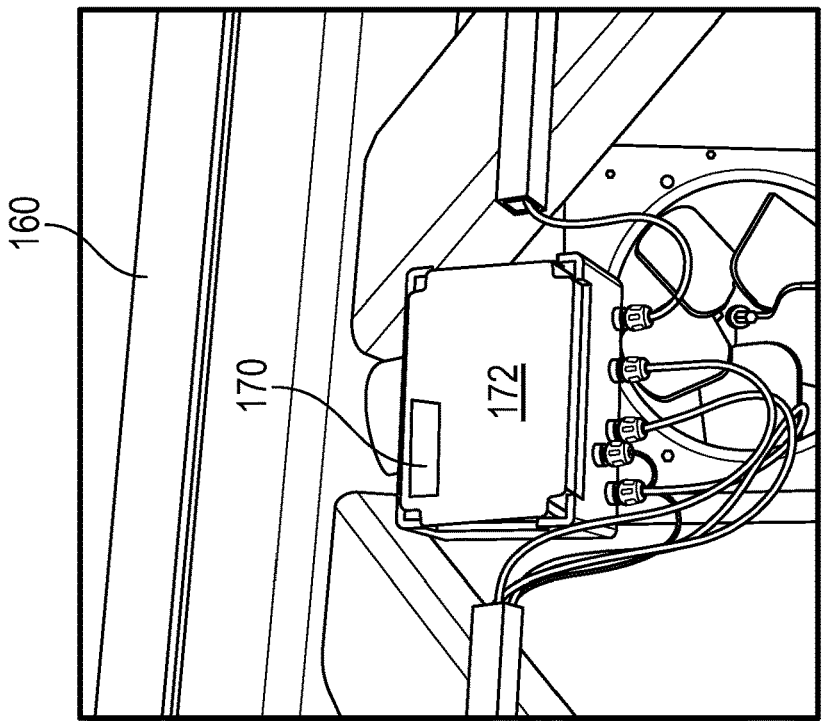
Figure 20:
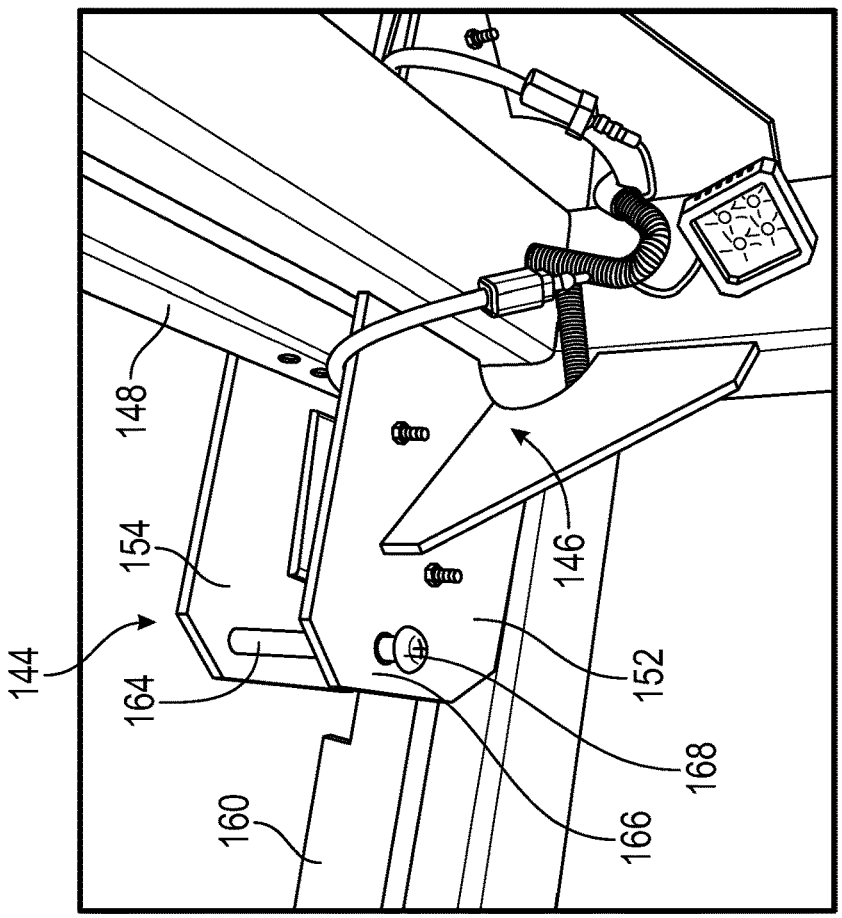

As mentioned above, the support apparatus 12 also includes various on-board subsystems 20 attached to the frame assembly 14. Referring to FIGS. 7-10 and 13, the support apparatus 12 is provided with power supply system 22 which include two battery banks 86 rigidly secured to the sheet material 42. The battery banks 86 include one or more batteries and power conditioning (not shown) that is electrically coupled to an electrical service panel 88 on a main control panel 90 supported at an end of the frame 14. The service panel 88 may be electrically coupled to the electrical components of the support apparatus 12 for providing primary or auxiliary electrical power thereto. With reference now to FIGS. 16-17, the power supply system 22 also includes an assembly 114 to electrically ground the support apparatus 12. The assembly 114 includes a grounding reel 116 with a retractable grounding wire 118 electrically connected to the support apparatus 12. The assembly 114 also includes a portable grounding rod 120 that can be readily pounded into the ground adjacent the support apparatus 12. A clamp or clip 122 attached to the end of the retractable ground with 118 can be releasably secured to the grounding rod 120 for electrically grounding the support apparatus 12.

The power supply system 22 may further include one or more solar panels 92 with power conditioning 94 electrically coupled to the battery banks 86 and/or the electrical service panel 88 to provide electrical power thereto for charging the battery banks 86 and/or for generating primary or auxiliary power. In one embodiment, the solar panels 92 are positionable with respect to the frame 14 between a stowed position and a deployed position. For example, as seen in FIG. 9, the solar panel 92 is pivotally supported along an upper edge 94 on an axle 96 between structural members of the frame 14 such as vertical posts 30 or diagonal beams 35. One or more supports 98 extend between the solar panel 92 and a lower portion of the frame 14. The supports 98 are adjustable for moving the solar panels 92 between a stowed position vertically oriented between the vertical posts 30 and a deployed position angularly extending from the frame 14 as shown in the figures. The supports 98 are adjustable to affect this pivoting movement of the solar panels 98. For example, the supports 98 may be a linear actuator for extending and retracting the length of the support. Alternately, the support 98 may be rotatably supported on the frame 14 and slidably supported on the solar panel 92. Latch posts 100 extend upwardly from the base 38 and terminate at a latch 102 that cooperates with the solar panel 92 for securing it in the stowed position. Once the latch 102 is released, the support 98, which in one embodiment is a pneumatic cylinder, may extend to deploy the solar panel 92.

One skilled in the art will recognize that the components used to deploy, operate and stow the various components of the support apparatus 12 may be manually adjustable (e.g., height adjustable foot 54), mechanically adjustable (e.g., chute actuator 76), electrically adjustable, hydraulically adjustable (e.g., gate actuator 82) or pneumatically adjustable (e.g., solar panel supports 98). When implementing an electrically adjustable component, such as an electrical actuator, it is electrically coupled to the electrical service panel 88 via control devices 104.1, 104.2, which may be located locally on the main control panel 90 or remotely in a remote operator console 106. When implementing a hydraulically adjustable component, such as a hydraulic actuator, it is hydraulically coupled to the other components of the hydraulic system including a hydraulic pump 100 in fluid communication with a hydraulic storage tank or sump 112 and a hydraulic system controller 108.

Figure 14:
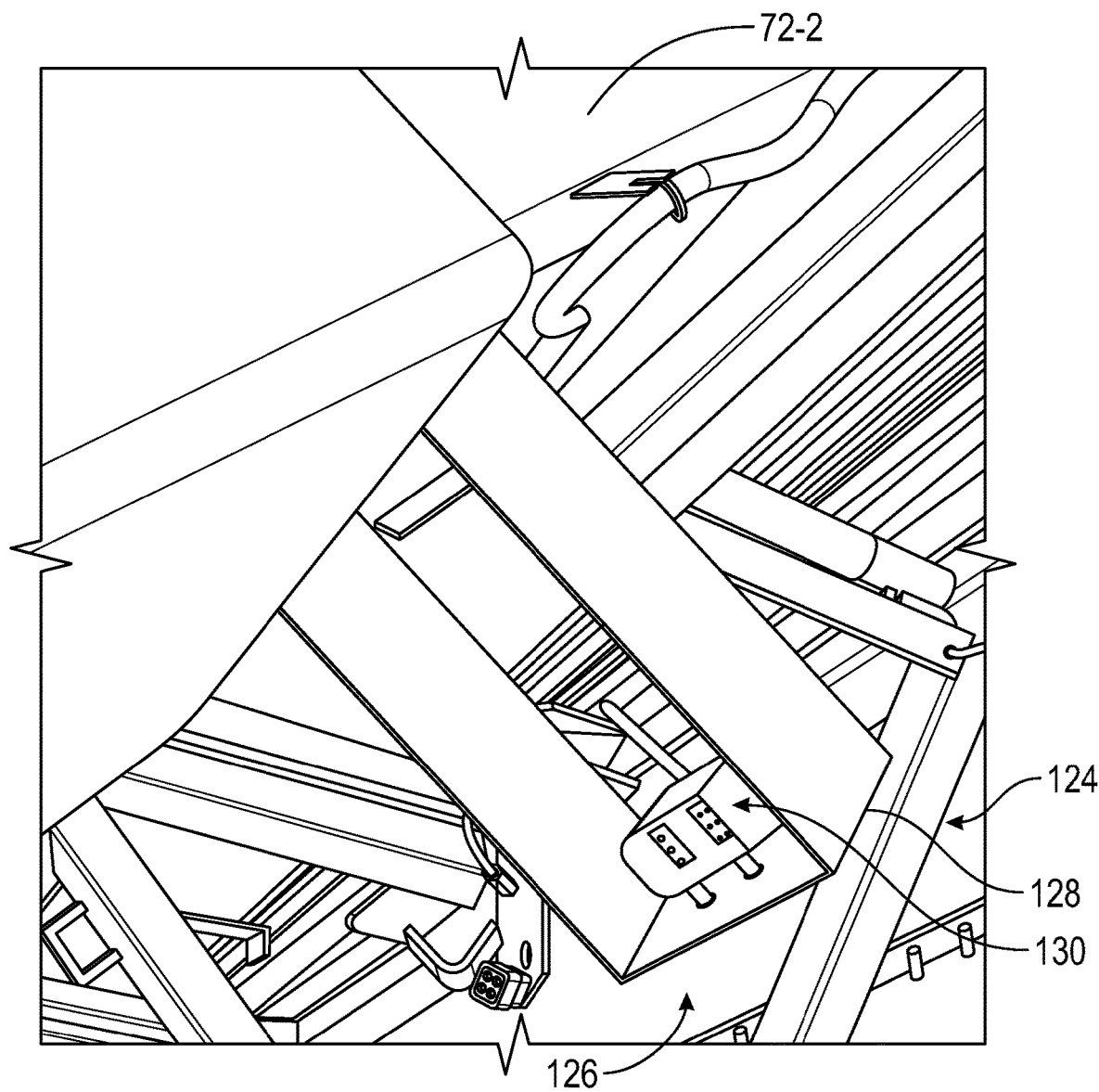
FIGS. 14-15 illustrate a wireless vision subsystem for monitoring the operation of the support apparatus.

The on-board subsystems 20 may include a vision subsystem 124 configured to visually monitor the state and operational status of the support apparatus 12. As shown in FIG. 14, the vision subsystem 124 includes a camera assembly 126 for monitoring proppant being discharged from the chute assembly 18. Camera assembly 126 includes a U-shaped support brace 128 extending from the upper chute 72.2 of the middle chute assembly 18.2. A camera 130 is secured to the support brace 128 and aimed toward the recessed region 44 in the frame so that the second ends 70 of the lower chutes 74 and a hopper (not shown) positioned in the feed station are within a field of view of the camera 130. As shown in FIG. 15, the vision subsystem 124 also includes a camera assembly 132 for monitoring the position of the gate actuator 60 in each of the container bays. Camera assembly 132 includes a support beam 134 extending between upper cross beams 34. A camera 136 is secured to the support beam 134 and aimed toward the gate actuator 60 so that the coupling 76 and the end of the linear actuator 82 are within a field of view of camera 136. In an embodiment, camera 130, 136 are weatherproof cameras electrically coupled to the power supply system 22 and configured to capture and wirelessly transmit live video from a low light scene to a remote display 138 (see FIGS. 23-24). One skilled in the art will recognize that additional camera assemblies may be deployed on and around the support apparatus 12 to visually monitor the state and operational status of the support apparatus 12.

The on-board subsystems 20 may include an in-situ weigh scale system 140 configured to measure the weight of the containers 10 supported on the support apparatus 12. As shown in FIGS. 8 and 18-21, the weigh scale system 140 includes an in-situ weigh station 142.1, 142.2, 142.3 for each of the container bays 12.1, 12.2, 12.3. It will be understood that each of the in-situ weigh stations 142 are substantially the same such that only one weigh station needs to be further described herein. The in-situ weigh station 142 includes four scales 144, one located at each of the corner of the container bay 12. With particular reference now to FIGS. 18-21, each scale 144 includes a lower support or base 146, a weighing platform 148 and a load cell 150 positioned between the base 146 and the weighing platform 148. The base 146 includes a base plate 152 rigidly secured between the upper longitudinal beams 32 and upper cross beams 34, and a gusset plate 154 rigidly secured between the base plate 152 and the vertical post 30. The load cell 150 is secured to the base plate 152 by bolts or another similar fastening technique.

The weighing platform 148 includes an upper plate 154 resting on top of the load cell 150. A stacking cone 156 may be welded to the top of the upper plate 154 and configured to engage, locate and stabilize a container 10 loaded into the bay. A rectangular frame 158 includes angle iron members 160 having a horizontal flange that extends above the upper longitudinal beams 32 and the cross beams 34 and a vertical flange set inside the upper longitudinal beams 32 and the cross beams 34 between the upper plate 154 of adjacent load cells 150 within a given bay. In this way, the weighing platform 148 floats on top of the four scales 144 within the in-situ weigh station 142. A retainer extends from the weighing platform 148 and is configured to prevent the upper plate 154 from lifting off of the load cell 150 when a container is removed from the support apparatus 12. In an embodiment shown in FIGS. 18-19, the retainer is a J-shaped catch 162 extending downward from the frame 158 beneath the upper longitudinal and cross beams 32, 34 to impede any significant upward displacement of the weighing platform 148. In an embodiment shown in FIG. 20, the retainer is a pin 164 extend downwardly from the bottom of the upper plate 154 and through a hole 166 in the base plate 152. A stop 168 is formed on an end of the pin 164 opposite the upper plate 154 to impede any significant upward displacement of the weighing platform 148.

Each of the load cells 150 in a given weigh station 142 generates a data signal based on the vertical load (i.e., weight) between the base 146 and the weighing platform 148. These data signals are communicated to a load cell processor 170 in a junction box 172 that computes a total weight on a given weigh station 142, which may be displayed locally at the weigh station 142 or communicated to a remote digital readout 174 (see FIGS. 23-24).

Figure 23:
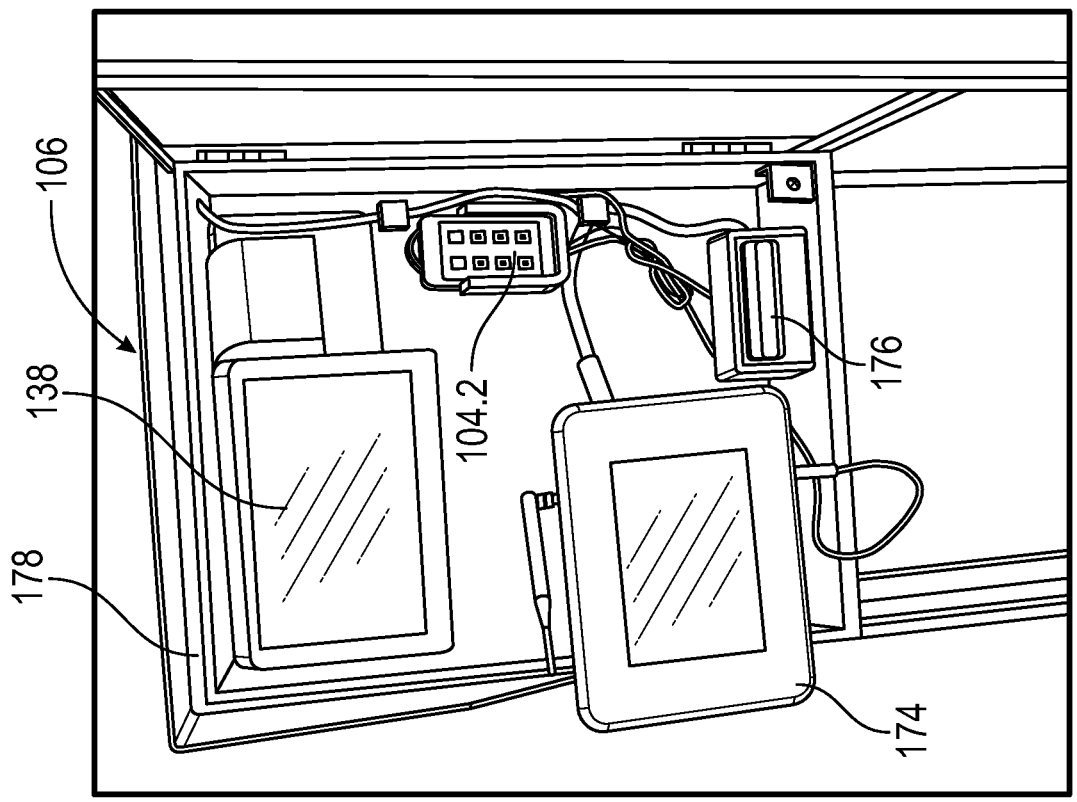
FIGS. 22-24 illustrate a remote operator console for monitoring and operating the support apparatus.
Figure 22:
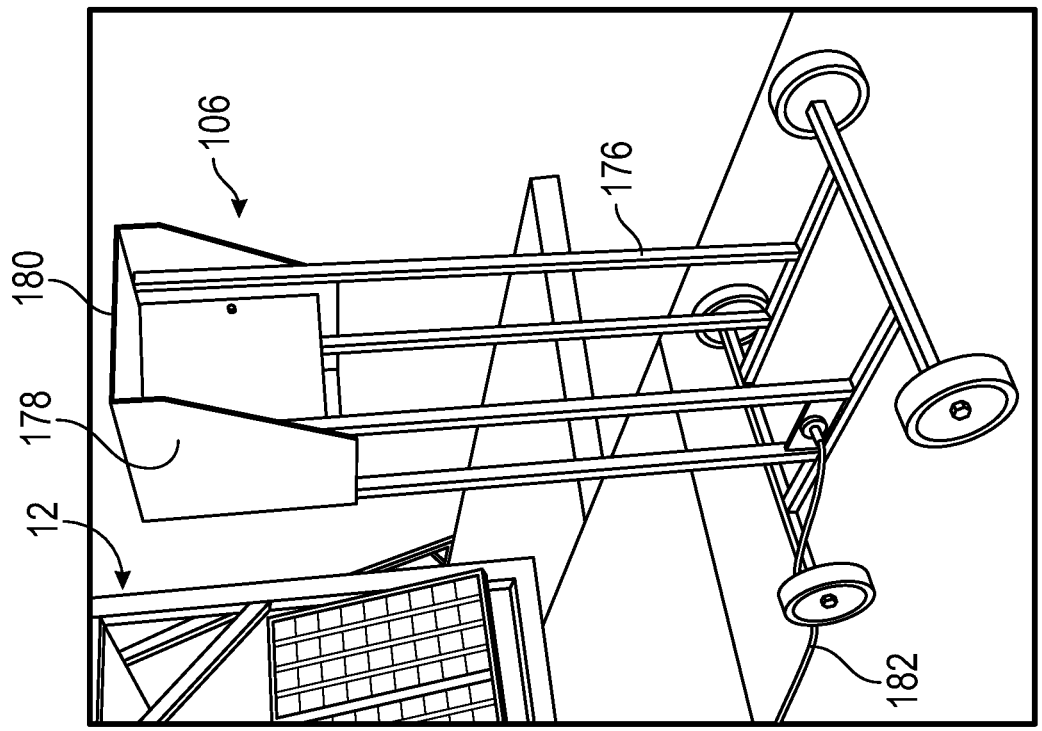
Figure 24:
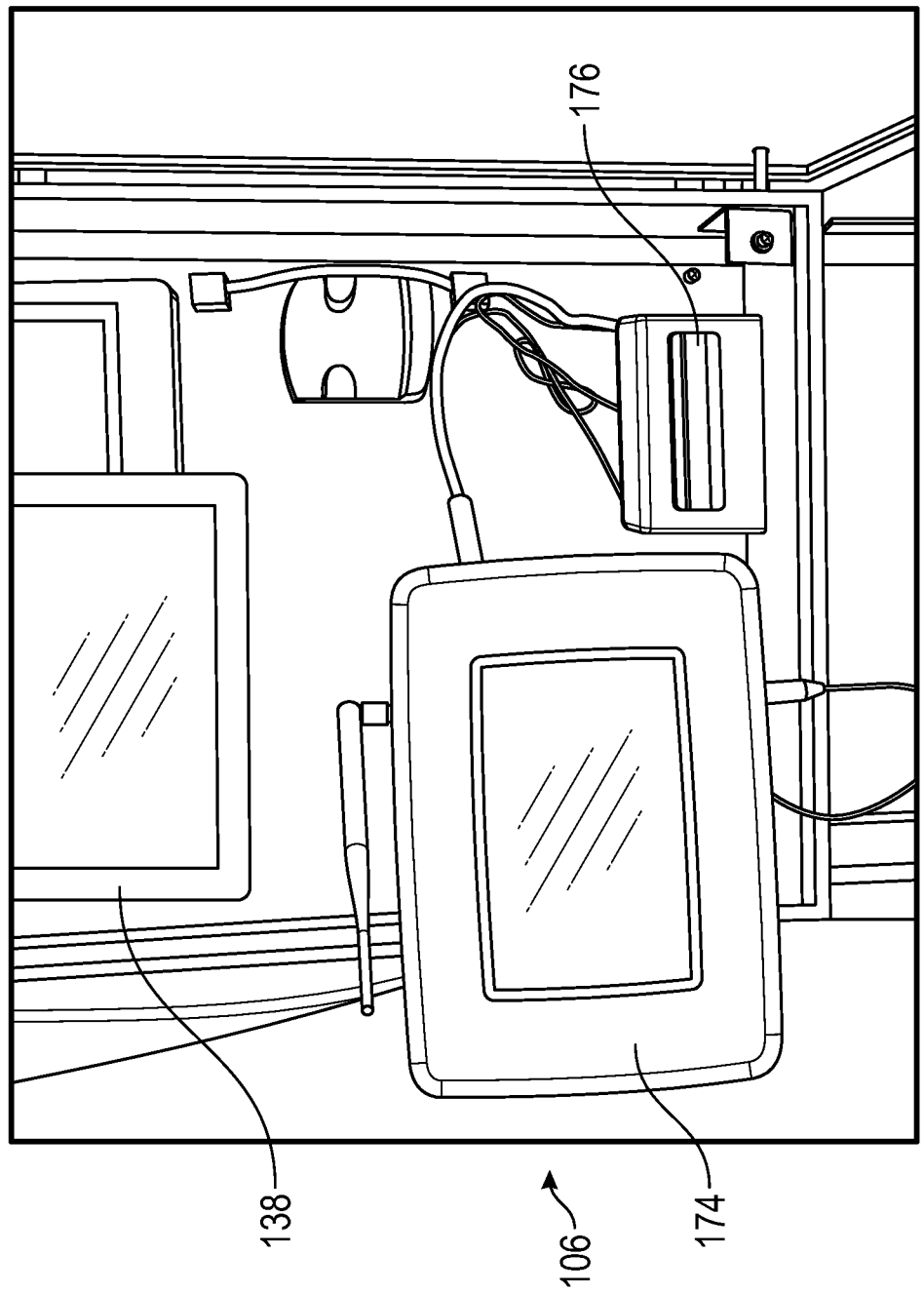

With reference now to FIGS. 22-24, the support apparatus 12 may include a remote operator console 106 which is in wired and/or wireless communications with the other subsystems 20 previously described. In the embodiment illustrated in FIGS. 22-24, the remote operator console 106 includes a wheeled stand or dolly 176 supporting an enclosure 178 having a hood 180. An umbilical cord 182 extends from the console 106 to the support apparatus 12 and may include electrical cords for providing electrical power to the enclosure 178 and/or data transmission cords for communicating data signals and control signal between the support apparatus 12 and the remote console 106. As shown in FIGS. 23-24, the remote console includes a video display 138 for the vision subsystem 124, the remote digital readout 174 for the weigh scale system 140, a tablet 104.2 configured to remotely control the hydraulic system controller 108 and an onboard power supply 176. One skilled in the art will recognize that the remote operator console may be equipped with additional systems used in the support of proppant delivery to a target site at a fracturing operation such as a radio for providing two-way communication, a laptop computer or other local computing device.

When deployed for a fracturing operation near an oil well site, the support apparatus 12 provides an efficient means for establishing the necessary infrastructure to deliver proppant to a hopper in the feed station. In this regard, the support apparatus 12 is located in a predetermined location using a field transport vehicle such as a fork lift truck. Specifically, the support apparatus 12 may be transported to the well site using conventional means such as a rail car or flatbed trailer-truck. The forks of the fork lift truck are positioned into cross beams 38 and the support apparatus 12 is removed and placed at the predetermined location. For example, the support apparatus 12 may be placed next to a blender apparatus such that the blender hopper (not shown) is located in the recessed region 44 of the frame 14. Next the support apparatus 12 may be stabilized by extending the feet 54 from the leveling jacks 52 at the end of the outriggers 50 to level the support apparatus 12. The chutes 18 are then positioned so that the second end 72 of the chute section 58 is above the blender hopper. The solar panels 92 may also be moved from the stowed position to the deployed position and the on-board subsystems 20 powered up and tested for proper functioning.

Once so positioned, the field transport vehicle may be used to retrieve a proppant container 10 and locate it on the elevated load surface 18 such that the pin of a gate assembly is received in the coupling 78. Additional proppant containers 10 may be retrieved and located on the elevated load surface 18 until all the bays of the support apparatus 12 are occupied. The gate actuator 60 is remotely operated to selectively position the gate assembly for each proppant container 10. Proppant for each container 10 is gravity-fed through the chute assembly 58 for delivery to the blender hopper. When a proppant container 10 has emptied all of the proppant stored therein, the empty proppant container 10 may be removed from the support apparatus 12 and replaced with a filled proppant container 10.

Because the support apparatus 12 can be operated in a stand-alone mode, the various controllers associated with the on-board subsystems 20 can be configured to reduce power consumption by switching between a "SLEEP" mode in which subsystems are not operational and consume little to no power and an "ON" mode in which the subsystems are fully powered and operational. For example, the hydraulic system and particularly the hydraulic pump 100 consumes a significant amount of power when fully powered and operational. As such, the hydraulic system controller 108 may be configured go into SLEEP mode by shutting down the hydraulic pump 100 when hydraulic pressure is not needed to operate a hydraulic component. Once a control signal is received to operate a hydraulic component, for example when manipulation of the gate actuator 60 is requested, the hydraulic system controller 108 switches to the ON mode and turns on the hydraulic pump 100 to provide hydraulic pressure for operating the hydraulic component. In this way, the hydraulic system may be instantaneously activated to provide on-demand hydraulics, while conserving power when hydraulics are not needed. A similar on-demand activation may be implemented for other subsystems associated with the support apparatus 10.

Various embodiments and methods have been presented in the foregoing detailed description, it should, however, be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A support apparatus for unloading a modular proppant container having a gate assembly comprising:
    a frame assembly including a base frame section, a plurality of posts extending upwardly from the base frame section and an upper frame section fastened to the plurality of posts in spaced relationship to the base frame assembly, the upper frame section providing an elevated load surface configured to support the modular proppant container in a position above a ground level, wherein the base frame section includes a recessed region beneath the upper frame section providing a feed station, the frame assembly further comprising:
        a right bay and a left bay, wherein the base frame section of the right bay and the left bay comprises:
            two lower longitudinal beams;
            two lower cross beams connected to the two lower longitudinal beams to form a rectangular configuration; and
            a pair of intermediate longitudinal beams extending between the two lower cross beams and
        a middle bay, wherein the base frame section of the middle bay comprises:
            two lower longitudinal beams;
            two lower cross beams connected to the two lower longitudinal beams to form a rectangular configuration;
            a third lower longitudinal beam located parallel to and between the two other lower longitudinal beams; and
            a pair of intermediate cross beams extending between the third lower longitudinal beam and one of the other two lower longitudinal beams,
        wherein the pair of intermediate longitudinal beams of the right bay and the left bay are positioned parallel to the third lower longitudinal beam of the middle bay and the pair of intermediate longitudinal beams of the right bay and the left bay are positioned perpendicular to the pair of intermediate cross beams of the middle bay;
    a chute assembly supported by the frame assembly beneath the elevated load surface, the chute assembly having a funnel section formed by a wall tapering from an inlet at a top of the wall subjacent to the elevated load surface to an outlet below the inlet, a chute section extending downwardly from a first end at the outlet of the funnel section to a second end opposite the first end and terminating above the recessed region; and
    a gate actuator including a coupling configured to engage with the gate assembly of a modular proppant container supported on the elevated load surface and a drive mechanism extending between the frame assembly and the coupling to selectively position the coupling for adjusting the gate assembly.

2. The support apparatus according to claim 1, wherein the chute section comprises an upper chute secured to the funnel section and a lower chute slidably supported by the upper chute, wherein an overall length of the chute section is adjustable by moving the upper chute in a longitudinal direction along the upper chute.

3. The support apparatus according to claim 2, wherein the chute section further comprises an actuator operably coupled to the lower chute for moving the lower chute relative to the upper chute.

4. The support apparatus according to claim 1, wherein the chute section comprises an upper chute rotatably supported on the funnel section, a lower chute extending from the upper chute, wherein the chute section angularly adjustable with respect to the funnel section.

5. The support apparatus according to claim 1, wherein at least one of the funnel section and the chute section comprises a low friction coating formed on an interior surface thereof for reducing a coefficient of friction relative to an uncoated surface.

6. The support apparatus according to claim 1, further comprising a vibration mechanism operably coupled to the chute assembly for vibrating at least one of the funnel section and the chute section.

7. The support apparatus according to claim 1, further comprising an aeration mechanism operably coupled to the chute assembly, wherein the aeration mechanism is configured to inject a fluid stream for transporting proppant discharged from the modular container in the fluid stream.

8. The support apparatus according to claim 1, further comprising a feed mechanism operably disposed in the chute assembly for moving proppant discharged from the modular container through the chute assembly.

9. The support apparatus according to claim 1, wherein the frame assembly further comprises a sheet material supported on the base frame section for providing a floor surface.

10. The support apparatus according to claim 1, further comprising a power supply subsystem having a solar panel supported on the frame assembly, a battery bank and power conditioning circuitry for electrically powering the support apparatus, wherein the solar panel is positionable relative to the frame between a stowed position and a deployed position.

11. The support apparatus according to claim 1, further comprising an on-board subsystem attached to the frame assembly for operating the support apparatus in a stand-alone mode, wherein the on-board subsystem includes a controller configured to switch between a Sleep Mode in which the on-board subsystem is not operational and consumes little to no power and an On Mode in which the on-board subsystem is fully powered and operational.

12. A support apparatus for unloading a modular proppant container having a gate assembly comprising:
a frame assembly including an upper frame section and a plurality of posts fastened to the upper frame section in spaced relationship and extending downwardly therefrom, the upper frame section providing an elevated load surface configured to support the modular proppant container in a position above a ground level, the frame assembly further comprising:
a right bay and a left bay, wherein the base frame section of the right bay and the left bay comprises:
two lower longitudinal beams;
two lower cross beams connected to the two lower longitudinal beams to form a rectangular configuration; and
a pair of intermediate longitudinal beams extending between the two lower cross beams and
a middle bay, wherein the base frame section of the middle bay comprises:
two lower longitudinal beams;
two lower cross beams connected to the two lower longitudinal beams to form a rectangular configuration;
a third lower longitudinal beam located parallel to and between the two other lower longitudinal beams; and
a pair of intermediate cross beams extending between the third lower longitudinal beam and one of the other two lower longitudinal beams,
wherein the pair of intermediate longitudinal beams of the right bay and the left bay are positioned parallel to the third lower longitudinal beam of the middle bay and the pair of intermediate longitudinal beams of the right bay and the left bay are positioned perpendicular to the pair of intermediate cross beams of the middle bay;
a chute assembly supported by the frame assembly beneath the elevated load surface, the chute assembly having a funnel section formed by a wall tapering from an inlet at a top of the wall subjacent to the elevated load surface to an outlet below the inlet, a chute section extending downwardly from a first end at the outlet of the funnel section to a second end opposite the first end and terminating at a feed station below the elevated surface;
a gate actuator including a coupling configured to engage with the gate assembly of a modular proppant container supported on the elevated load surface and a drive mechanism extending between the frame assembly and the coupling to selectively position the coupling for adjusting the gate assembly; and
an on-board subsystem attached to the frame assembly for operating the support apparatus in a stand-alone mode, wherein the on-board subsystem includes a controller configured to switch between a Sleep Mode in which the on-board subsystem is not operational and consumes little to no power and an On Mode in which the on-board subsystem is fully powered and operational.

13. The support apparatus according to claim 12, wherein the on-board subsystem comprises a hydraulic subsystem having a hydraulic pump in fluid communication with a hydraulic fluid storage tank and a hydraulic system controller, wherein the hydraulic subsystem is hydraulically coupled to a hydraulic actuator for actuating a component on the support apparatus.

14. The support apparatus according to claim 12, wherein the on-board subsystem comprises a vision subsystem having a camera assembly including a support brace extending from the frame assembly, a camera mounted to the support brace and a display located remotely from the support apparatus, wherein the camera is aimed toward the gate actuator such that that the coupling and a portion of the drive mechanism are within a field of view of the camera and the vision system is configured to capture and wirelessly transmit live video of the field of view to the remote display.

15. The support apparatus according to claim 12, further comprising a power supply subsystem having a solar panel supported on the frame assembly, a battery bank and power conditioning circuitry for electrically powering the support apparatus, wherein the solar panel is positionable relative to the frame between a stowed position and a deployed position.

16. The support apparatus according to claim 1, wherein the upper frame section includes two longitudinal beams and two cross beams forming a rectangular container bay configured to support the modular proppant container in a position above a ground level and the support apparatus further comprises an in-situ weigh station configured to measure the weight of the modular proppant container supported on an elevated surface in the rectangular container bay, wherein the in-situ weigh station includes:
a scale located at each corner of the rectangular container bay, each scale including a base plate rigidly attached to the upper frame section and a load cell positioned on top of the base plate;
a weighing platform including an upper plate resting on top of the load cell at each corner of the rectangular container bay and a rectangular frame extending between the upper plate of adjacent load cells; and
a load cell processor configured to receive an input data signal from each load cell representing the vertical load between the base plate and the upper plate, compute a total weight on the in-situ weigh station and send an output data signal representing the total weight.

17. The support apparatus according to claim 16, wherein the rectangular frame of the weighing platform comprises a horizontal flange extending above the longitudinal beams and the cross beams and a vertical flange set inside the upper longitudinal beams and the cross beams, wherein the weighing platform floats on top of the four scales within the in-situ weigh station.

18. The support apparatus according to claim 16, wherein the in-situ weigh station further comprises a plurality of retainers extending from the weighing platform and configured to engage the upper frame section for preventing the upper plate from lifting off of the load cell when the modular proppant container is removed from the support apparatus.

19. The support apparatus according to claim 18, wherein each retainer comprises a J-shaped catch extending downward from the rectangular frame beneath at least one of the longitudinal beam and the cross beams to impede upward displacement of the weighing platform when the modular proppant container is removed from the support apparatus.

20. The support apparatus according to claim 18, wherein each retainer comprises a pin extending downwardly from a bottom of the upper plate and through a hole formed in the base plate and a stop formed on an end of the pin opposite the upper plate to impede any significant upward displacement of the weighing platform when the modular proppant container is removed from the support apparatus.

* * * * *